US012316016B2

(12) United States Patent
Turpin et al.

(10) Patent No.: US 12,316,016 B2
(45) **Date of Patent: *May 27, 2025**

(54) MULTI-BAND LENS ANTENNA SYSTEM

(71) Applicant: All.Space Networks Limited, Reading (GB)

(72) Inventors: Jeremiah P. Turpin, Linthicum, MD (US); Clinton P. Scarborough, Darlington, MD (US); Daniel F. DiFonzo, Rockville, MD (US); Brian Murphy Billman, Baltimore, MD (US)

(73) Assignee: All.Space Networks Limited, Reading (GB)

( * ) Notice: Subject to any disclaimer, the term of this patent is extended or adjusted under 35 U.S.C. 154(b) by 44 days.

This patent is subject to a terminal disclaimer.

(21) Appl. No.: 18/084,409

(22) Filed: Dec. 19, 2022

(65) Prior Publication Data

US 2023/0231324 A1 Jul. 20, 2023

Related U.S. Application Data

(63) Continuation of application No. 16/576,408, filed on Sep. 19, 2019, now Pat. No. 11,605,905.

(60) Provisional application No. 62/733,448, filed on Sep. 19, 2018.

(51) Int. Cl.
*H01Q 25/00* (2006.01)
*H01Q 5/42* (2015.01)
*H01Q 19/06* (2006.01)

(52) U.S. Cl.
CPC ............ *H01Q 25/008* (2013.01); *H01Q 5/42* (2015.01); *H01Q 19/062* (2013.01)

(58) Field of Classification Search
CPC ........ H01Q 5/42; H01Q 19/06; H01Q 19/062; H01Q 25/008
See application file for complete search history.

(56) References Cited

U.S. PATENT DOCUMENTS

| | | | | |
|---|---|---|---|---|
| 4,332,018 A * | 5/1982 | Sternberg | G10K 11/30 367/905 |
| 4,845,507 A | 7/1989 | Archer et al. | |
| 5,283,587 A | 2/1994 | Hirshfield et al. | |
| 5,436,453 A | 7/1995 | Chang et al. | |

(Continued)

FOREIGN PATENT DOCUMENTS

| | | | | |
|---|---|---|---|---|
| GB | 2511845 A * | 9/2014 | G02B 6/32 |
| JP | 9008534 | 1/1997 | |

(Continued)

OTHER PUBLICATIONS

Extended European Search Report dated Apr. 20, 2018 in connection with European Application No. 17196795.3.

(Continued)

*Primary Examiner* — Daniel Munoz
(74) *Attorney, Agent, or Firm* — Wolf, Greenfield & Sacks, P.C.

(57) ABSTRACT

A multi-band antenna system that includes a first antenna array and a second antenna array. The first antenna array includes a plurality of lens sets, each including a lens and feed element(s) configured to transmit and/or receive electromagnetic signals that pass through the lens. The second antenna array includes a plurality of antenna elements, each disposed between two of the lenses of the first array.

20 Claims, 16 Drawing Sheets

(56) References Cited

U.S. PATENT DOCUMENTS

| | | | |
|---|---|---|---|
| 5,457,465 | A | 10/1995 | Collier et al. |
| 5,821,908 | A | 10/1998 | Sreenivas |
| 6,133,887 | A | 10/2000 | Tanizaki et al. |
| 10,116,051 | B2 | 10/2018 | Scarborough et al. |
| 10,256,537 | B2 | 4/2019 | Besoli et al. |
| 11,605,905 | B2 | 3/2023 | Turpin et al. |
| 2008/0238795 | A1 | 10/2008 | Alamouti et al. |
| 2017/0040705 | A1 | 2/2017 | Matitsine et al. |
| 2017/0040706 | A1 | 2/2017 | Matitsine et al. |
| 2017/0062944 | A1 | 3/2017 | Zimmerman et al. |
| 2019/0237874 | A1 | 8/2019 | Michaelis et al. |
| 2020/0091622 | A1 | 3/2020 | Turpin et al. |

FOREIGN PATENT DOCUMENTS

| | | | |
|---|---|---|---|
| JP | 2000-022423 | A | 1/2000 |
| JP | 2000-196345 | A | 7/2000 |
| WO | WO 2018/048520 | A1 | 3/2018 |
| WO | WO 2018/132511 | A1 | 7/2018 |

OTHER PUBLICATIONS

International Search Report and Written Opinion mailed May 3, 2013 in connection with International Application No. PCT/IB2018/051752.

International Search Report and Written Opinion mailed Dec. 17, 2019 in connection with International Application No. PCT/IB2019/057947.

International Preliminary Report on Patentability mailed Apr. 1, 2021 in connection with International Application No. PCT/IB2019/057947.

Elsherbiny et al., Holographic Antenna Concept, Analysis, and Parameters. IEEE Transactions on Antennas and Propagation, vol. 52. No. 3, Mar. 2004, pp. 830-839.

Gregory et al., Exploiting Rotational Symmetry for the Design of Ultra-Wideband Planar Phased Array Layouts. IEEE Transactions on Antennas and Propagation, vol. 61, No. 1, Jan. 2013, pp. 176-184.

Li et al., Beam Scanning Array Based on Luneburg Lens. IEEE, 2014, pp. 1274-1278.

Li et al., Loneburg Lens with Extended Fiat Focal Surface for Electronic Scan Applications. Optics Express, vol. 24, No. 7, Mar. 25, 2018; 11 pages.

Mateo-Segura et al., Flat Luneburg Lens via Transformation Optics for Directive Antenna Applications. IEEE Transactions on Antennas and Propagation, vol. 62, No. 4, Apr. 2014, pp. 1945-1953.

Napier et al., The Very Large Array: Design and Performance of a Modern Synthesis Radio Telescope, Proceedings of the IEEE, vol. 71, No. 11, Nov. 1983, pp. 1295-1300.

Vo H., Development of an Ultra-Wideband Low-Profile Wide Scan Angle Phased Array Antenna. Dissertation; Ohio State University; 2015; 12 pgs.

* cited by examiner

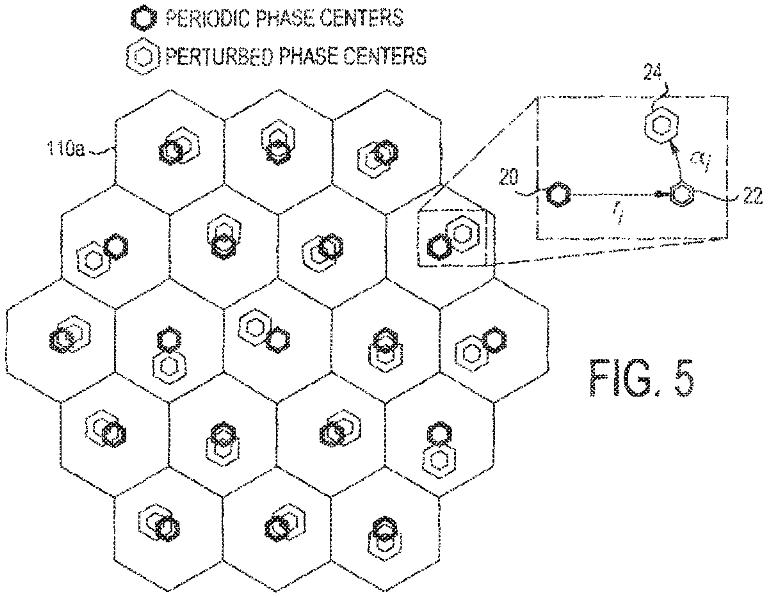
FIG. 5
FIG. 6a
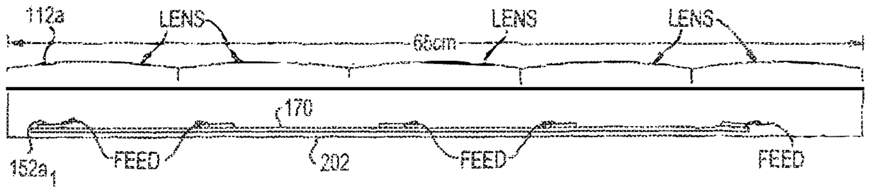
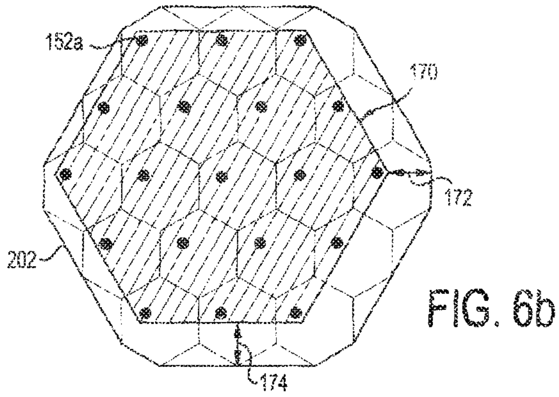
FIG. 6b

MULTI-BAND LENS ANTENNA SYSTEM

CROSS REFERENCE TO RELATED APPLICATIONS

This application claims the benefit as a continuation under 35 U.S.C. § 120 of U.S. patent application Ser. No. 16/576,408, filed Sep. 19, 2019 and entitled "MULTI-BAND LENS ANTENNA SYSTEM," which is hereby incorporated by reference herein in its entirety.

U.S. patent application Ser. No. 16/576,408 claims the benefit of priority of U.S. Application Ser. No. 62/733,448 filed on Sep. 19, 2018, the content of which is relied upon and incorporated herein by reference in its entirety. U.S. patent application Ser. No. 16/576,408 is also related to the disclosure of U.S. patent application Ser. No. 15/722,561, now U.S. Pat. No. 10,116,051, filed Oct. 2, 2017. The entire contents of the aforementioned patent application and patent are hereby incorporated by reference.

BACKGROUND

Field of the Invention

The present invention relates to a multi-band, multiple beam phased array antenna system. More particularly, the present invention relates to a broadband wide-angle multiple beam phased array antenna system with reduced number of components using wide-angle gradient index lenses each with multiple scannable beams.

Background of the Related Art

Like all devices, antenna systems face cost constraints. Additionally, in most applications, size is an even greater constraint on the development of antenna systems. The amount of available space on antenna towers is limited, as is the space available for terminals on mobile platforms.

U.S. Pat. No. 10,116,051 describes lens antenna systems with arrays of lens elements that enable the antenna array to use fewer feed elements (and associated RF/electrical circuitry) while maintaining the aperture efficiency and gain of previously-disclosed antenna systems while increasing the capability of the terminal. The need for fewer parts allows the lens antenna systems to have a smaller footprint and cost than previously-disclosed antenna arrays. The additional available space provided by the lens antenna array of U.S. Pat. No. 10,116,051 presents an opportunity for antenna system designers to further innovate and provide additional features while maintaining a footprint that is commensurate with the size of traditional antenna systems on the market before the disclosure of U.S. Pat. No. 10,116,051.

Multi-band antenna systems—for example, hybrid Ka/L-band systems and hybrid Ku/L-band systems—are particularly advantageous as they allow for communications over two frequency bands while maintaining the footprint of a single band system.

SUMMARY

In view of those technical obstacles and drawbacks in the prior art, a multi-band lens antenna system is provided. The multi-band lens antenna includes a first antenna array and a second antenna array. The first antenna array includes a plurality of lens sets, each including a lens and feed element(s) configured to transmit and/or receive electromagnetic signals that pass through the lens. The second antenna array includes a plurality of antenna elements. Critically, at least some of the antenna elements are disposed in the gaps between the lenses of the first array.

The first antenna array may transmit/receive signals in a first frequency band (e.g., the Ka band or the Ku band) and the second antenna array may transmit/receive electromagnetic signals in a second, lower frequency band (e.g., the L band). The antenna elements of the second antenna array may be flat antennas or wire elements (e.g., PCB Vivaldi antennas, dipoles, etc.). Alternatively, the antenna elements of the second antenna array may be electrically-small planar antennas (e.g., dielectric-loaded patch antennas) or other radiating aperture antennas. The multi-band lens antenna may be mechanically steerable in one or more dimensions. Additionally or alternatively, either or both of the first antenna array and/or the second antenna array may be electrically steerable. The multi-band lens antenna system may be planar or non-planar (e.g., conformal). The lenses may be non-spherical (e.g., flat).

BRIEF DESCRIPTION OF THE FIGURES

FIG. 5 is a top view of perturbed element phase centers for grating lobe control;

FIG. 6(*b*) is a top view of simplified beam steering of FIG. 6(*a*);

FIG. 6(*c*) is an illustration of a lens array in view of and communicating with multiple satellites;

FIG. 6(*d*) is an illustration of an exemplary lens array with hybrid electromechanical beam steering;

FIG. 6(*e*) is a diagram of another exemplary lens array with hybrid electromechanical beam steering, focusing on the mechanical positioning system;

FIG. 6(*f*) is another view of the lens array of FIG. 6(*e*);

FIG. 9(*b*) is a block diagram for a transmit-only circuit for the lens feed;

FIG. 11(*b*) is another functional block diagram for circuit implementation in the digital domain for digital beam processing;

FIG. 13(*b*) is a block diagram of the integrated communications terminal of FIG. 13(*a*);

DETAILED DESCRIPTION

Figure 1:
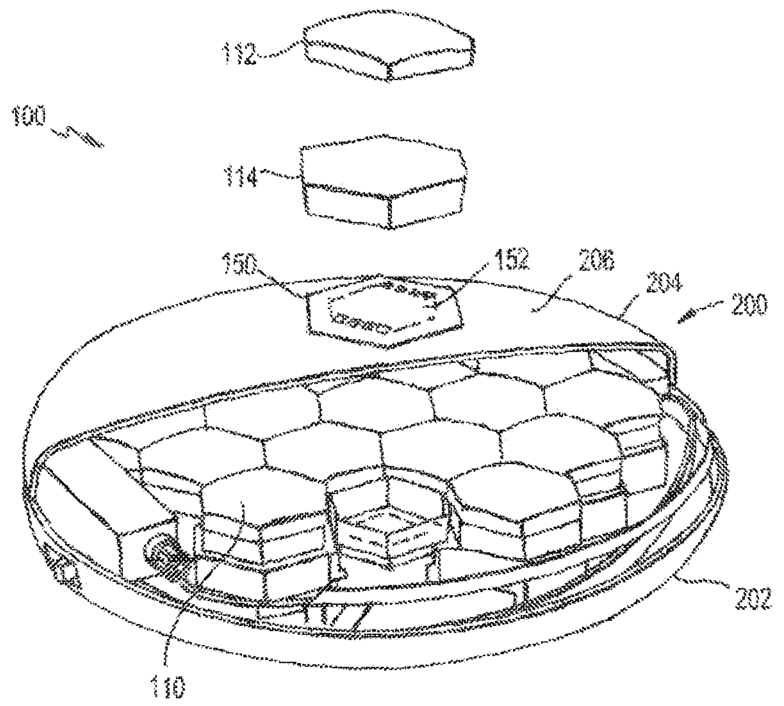
FIG. 1 is a cutaway perspective view of a multiple-beam phased array with electrically large multi-beam elements.

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIG. 1 shows a lens array 100. The lens array 100 has a plurality of lens sets 110. Each lens set 110 includes a lens 112, spacer 114 and feed set 150 which has multiple feed elements 152, as shown by the one exploded lens set 110 for purposes of illustration. The spacer 114 separates the lens 112 from the feed set 150 to match the appropriate focal length of the lens. The spacer 114 may be made out of a dielectric foam with a low dielectric constant. In other examples, the spacer 114 includes a support structure that creates a gap, such as an air gap, between the lens 112 and the feed set 150. In further examples, the lens set 110 does not include the spacer 114. The feed element 152 may be constructed as a planar microstrip antenna, such as a single or multilayer patch, slot, or dipole, or as a waveguide or aperture antenna. While depicted as a rectangular patch on a multilayer printed-circuit board (PCB), the feed element 152 may have an alternate configuration (size and/or shape).

The PCB forming the base of the feed set 150 within each lens set further includes signal processing and control circuitry ("lens set circuit"). The feed elements 152 may be identical throughout the feed set 150, or individual feeds 152 within the feed set 150 may be independently designed to optimize their performance based on their location beneath the lens 112. The physical arrangement of the feed elements 152 within the feed set 150 may be uniform on a hexagonal or rectilinear grid, or may be nonuniform, such as on a circular or other grid to optimize the cost and radiation efficiency of the lens array 100 as a whole. The feed elements 152 themselves may be any suitable type of feed element. For example, the feed elements 152 may correspond to printed circuit "patch-type" elements, air-filled or dielectric loaded horn or open-ended waveguides, dipoles, tightly-coupled dipole array (TCDA) (see Vo, Henry "DEVELOPMENT OF AN ULTRA-WIDEBAND LOW-PROFILE WIDE SCAN ANGLE PHASED ARRAY ANTENNA." Dissertation. Ohio State University, 2015), holographic aperture antennas (see M. ElSherbiny, A. E. Fathy, A. Rosen, G. Ayers, S. M. Perlow, "Holographic antenna concept, analysis, and parameters", IEEE Transactions on Antennas and Propagation, Volume 52 issue 3, pp. 830-839, 2004), other wavelength scale antennas, or a combination thereof. In some implementations, the feed elements 152 each have a directed non-hemispherical embedded radiation pattern.

Signals received by the lens array 100 enter each lens set 110 through the respective lens 112, which focuses the signal on one or more of the feed elements 152 of the feed set 150 for that lens set 110. The signal incident to a feed element is then passed to signal processing circuitry (lens set circuitry, followed by the antenna circuitry), which is described below. Likewise, signals transmitted by the lens array 100 are transmitted from a specific feed set 150 out through the respective lens 112.

The number of electrical and radio-frequency components e.g., amplifiers, transistors, filters, switches, etc. used in the lens array 100 is proportional to the total number of feed elements 152 in the feed sets 150. For example, there can be one component for each feed element 152 in each feed set 150. However, there can be more than one component for each teed element 152 or there can be several feed elements 152 for each component.

As shown, each lens set 110 has a hexagonal shape, and is immediately adjacent to a neighboring lens set 110 at each side to form a hexagonal tiling. Immediately adjacent lenses 112 may be in contact along their edges. The feed sets 150 are smaller in area than the lenses 112 due to the lens-feed optics, and can be substantially the same shape or a different shape than the lenses 112. While described herein as hexagonal, the lens may have other shapes, such as square or rectangular that allow tiling of the full array aperture. The feed sets 150 may not be in contact with one another and thus may avoid shorting or otherwise electronically interfering with one another. Because of the optical nature of the element beams formed at each lens, the feed displacement to produce scanned element beams is always substantially less than the distance in the focal plane from the lens center to its edge. Therefore, the number of feeds necessary to "fill" the required scan range or field of regard is less than for an array which must have the total aperture area fully populated by feed elements.

In some implementations of the lens array 100, the feed sets 150 fill approximately 25% of the area of each lens 112. The lens array 100 maintains similar aperture efficiency and has a total area similar to a conventional phased array of half-wavelength elements but with substantially fewer elements. In such implementations, the lens array 100 may include approximately only 25% of the number of feed elements as the conventional phased array in which the feed sets 150 fill 100% of the area of the lens array 100. Because the number of electrical and radio-frequency components used in the lens array 100 is proportional to the total number of feed elements 152 in the feed sets 150, the reduction of the number of feed elements 152 also reduces the number and complexity of the corresponding signal processing circuit components (amplifiers, transistors, filters, switches, etc.) by the same fraction. Furthermore, since only the selected feeds in each lens need be supplied with power, the total power consumption is substantially reduced compared with a conventional phased array.

As shown, the lens array 100 may be situated in a housing 200 having a base 202 and a cover or radome 204 that completely enclose the lens sets 110, feed sets 150, and other electronic components. In some implementations, the cover 204 includes an access opening for signal wires or feeds. The housing 200 is relatively thin and can form a top surface 206 for the lens array 100. The top surface 206 can be substantially planar or slightly curved. The lens sets 110 can also be situated on a substrate or base layer, such as a printed circuit board (PCB), that has electrical feeds or contacts that communicate signals with the feed elements 152 of the feed sets 150. The lens sets 110 may be arranged on the same plane, offset at different heights, or be tiled conformally across a nonplanar surface.

Figure 2:
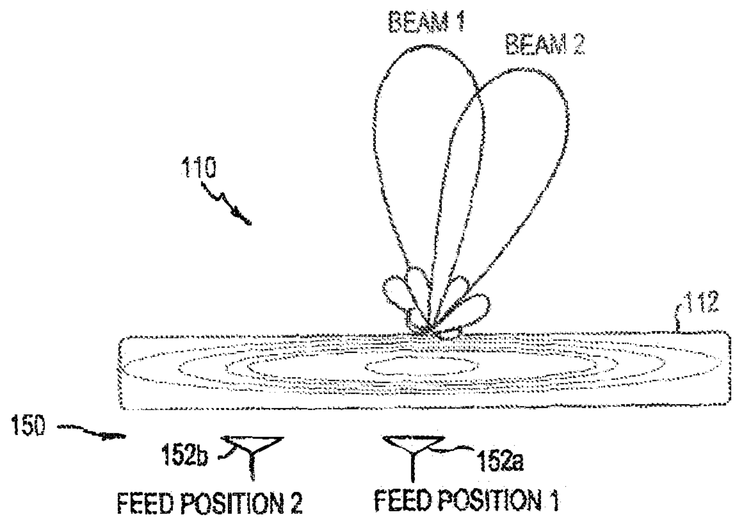
FIG. 2 is a side view of a moderate-gain lens and feed elements scanning their radiation patterns by feed selection for coarse pattern control.

FIG. 2 illustrates a lens set 110 having a lens 112 with multiple feed elements 152. Only two feed elements 152*a*, 152*b* are shown here for clarity but a typical feed cluster might have, for example, 19, 37, or more individual feeds. Each feed element 152 produces a relatively broad beam via the lens 112 at a specific angle depending on the feed element's displacement from the nominal focal point of the lens 112. In the example illustrated in FIG. 2, the first feed element 152*a* is directly aligned with the focal point of the lens 112 and generates a Beam 1 that is substantially normal to the lens 112 or the housing top surface 206, and the second feed element 152*b* is offset from the focal point of the lens 112 and generates a Beam 2 that is at an angle with respect to the lens 112 normal or the housing top surface 206. Accordingly, selectively activating one of the feed elements 152*a*, 152*b* enables the lens set 110 to generate a radiation pattern in a desired direction (i.e., to beam scan by feed selection). Therefore, the lens set 110 may operate in a wide range of angles.

Figure 3:
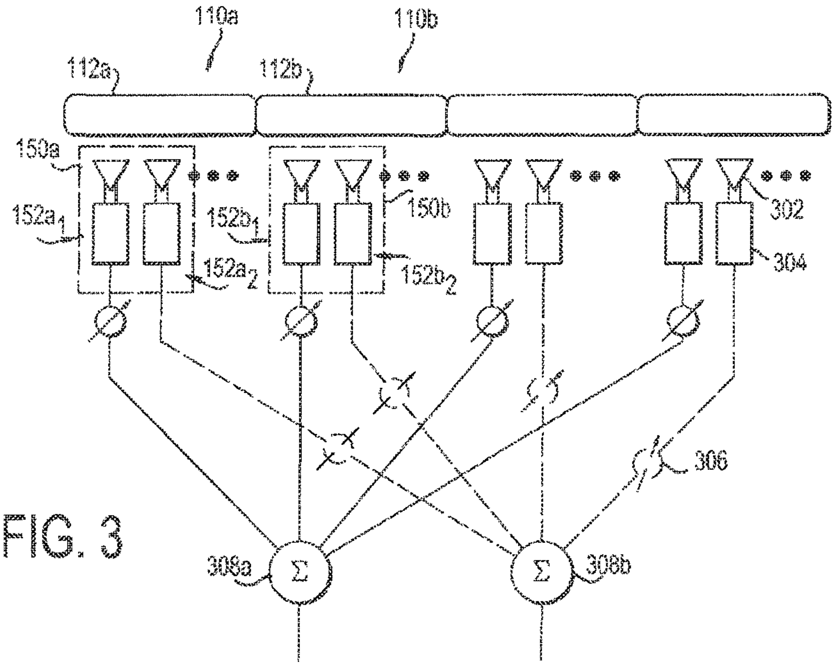
FIG. 3 is a block diagram of a multiple beam array of lens-feed elements phased to form multiple beams at desired scan angles with selected antenna elements.

FIG. 3 shows a simplified phased array having a lens array with multiple lens sets 110 and feed sets 150. Each lens set 110*a*, 110*b* has a lens 112*a*, 112*b* that is aligned with a respective feed set 150*a*, 150*b*, and each feed set 150*a*, 150*b* has multiple feed elements 152*a*, 152*b*. Each feed element 152 includes an antenna 302 and a sensing device 304, such as a reader or detector, connected to the antenna 302. The sensing device 304 is connected to a shifter 306 (time and/or phase), which is connected to a summer/divider 308. The shifter 306 provides a desired time and/or phase shift appropriate to the associated feed element 152. Each summer/divider 308 is connected to a respective one of the feed elements 152 in each of the feed sets 150. That is, corresponding feed elements 152 for each lens 112 are combined (or divided) in a phasing or time delay network. Accordingly, a first summer/divider 308*a* is connected to a first feed element 152$a_1$ of the first feed set 150*a* and a first feed element 152$b_1$ of the second feed set 150*b*, and a second summer/divider 308*b* is connected to a second feed element 152$a_2$ of the first feed set 150*a* and a second feed element 152$b_2$ of the second feed set 150*b*. Each signal passes through the shifter 306 before or after being summed or divided by the summer/divider 308. Each summer/divider circuit 308 may be directly connected (e.g., through the shifter 306) to a specific feed element 152 within each feed set 150 or may connected through a switching matrix to allow dynamic selection of a particular desired feed 152 from each lens set 110.

The circuitry within the sensing device 304 included in each feed element 152 may contain amplifiers, polarization control circuits, diplexers or time division duplex switches, and other components. Further, the sensing device 304 may be implemented as discrete components or integrated circuits. Further yet, the sensing device 304 may contain up- and down-converters so that the signal processing may take place at an intermediate frequency or even at baseband. While only a single phasing network is shown here for each beam to keep the drawing from being too cluttered, it is understood that, for each beam, a transmit phasing network and a receive phasing network may be employed. For some bands, such as Ku-band, it may be possible to employ a single time delay network that will serve to phase both the transmit and receive beam, keeping them coincident in angle space over the entire transmit and receive bands. Such broadband operation could also be possible over other Satcom bands. The figure shows how two simultaneous beams may be formed by having two such phasing networks. Extensions to more than two simultaneous beams should be evident from the description.

In operation, a signal received by the first lens 112*a* passes to the respective feed set 150*a*. The signal is received by the antennas 302 and circuits 304 of the first feed set 150*a* and passed to the shifters 306. Thus, the first feed element 152$a_1$ receives the signal and passes it to the first summer/divider 308*a* via its respective shifter 306, and the second teed element 152$a_2$ receives the signal and passes it to the second summer/divider 308*b* via its respective shifter 306. The second lens 112*b* passes the signal to its respective feed set 150*b*. The first feed element 152$b_1$ receives the signal and passes it to the first summer/divider 308*a* via its respective shifter 306, and the second feed element 152$b_2$ receives the signal and passes it to the second summer 308*b* via its respective shifter 306.

Signals are also transmitted in reverse, with the signal being divided by the summer/divider 308 and transmitted out from the lenses 112 via the shifters 306 and feed sets 150*a*. More specifically, the first divider 308*a* passes a signal to be transmitted to the first feed elements 152$a_1$, 152$b_1$ of the first and second feed sets 150*a*, 150*b* via respective shifters 306. And the second divider 308*b* passes the signal to the second feed elements 152$a_2$, 152$b_2$ of the first and second feed sets 150*a*, 150*b* via respective shifters 306. The feed elements 152$a_1$, 152$a_2$ of the first feed set 150*a* transmit the signal via the first lens 112*a* and the feed elements 152$b_1$, 152$b_2$ of the second feed set 150*b* transmit the signal via the second lens 112*b*.

Accordingly, the first summer/divider 308*a* processes all the signals received/transmitted over the first feed element 152 of each respective feed set 150, and the second summer/divider 308*b* processes all the signals received/transmitted over the second feed element 152 of each respective feed set 150. Accordingly, the first summer/divider 308*a* may be used to form beams that scan an angle associated with the first feed elements 152*a*, and the second summer/divider 308*b* may be used to form beams that scan an angle associated with the second feed elements 152*b*.

Accordingly, FIG. 3 illustrates an example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array.

The multi-beam capability of the lens array 100 is particularly well suited for systems that provide functionality for a transceiver to roam from one communications endpoint to another. Roaming generally refers to the ability of a communications device (most typically a cell phone) to connect via alternative carriers when out of the coverage of the primary carrier. However, that concept may be generalized to any antenna system establishing a communications link with a second satellite or terrestrial node (and not necessarily because the first satellite terminal is out of a given coverage area).

As noted above, the lens array 100 is capable of forming multiple simultaneous beams more economically than conventional arrays. For example, the multiple beam array illustrated in FIG. 3 includes a summer/divider 308*a* connected to a first feed element 152*a*$_1$ of the first feed set 150*a* and a first feed element 152*b*$_1$ of the second feed set 150*b*, etc. The multiple beam array also includes a second summer/divider 308*b*, which is connected to a second feed element 152*a*$_2$ of the first feed set 150*a* and a second feed element 152*b*$_2$ of the second feed set 150*b*. Such a multiple beam array may be used to enable communications via alternative carriers and/or to enhance the utilization of satellite capacity and connectivity by allowing dynamic or commendable rerouting of signals among several satellites or terrestrial nodes. For example, a system operator may command the array to change its beam directions to direct the reception and/or transmission of a multiple-beam terminal to different satellites.

The multiple beam array illustrated in FIG. 3, for example, may be configured as a remote mobile or fixed terminal in view of several satellites. The multiple beam array may provide a two-way communications link via a first satellite by activating and pointing a first beam (e.g., the signal being summed or divided by the summer/divider 308*a*) to any of a first hub, a first gateway terminal, or a first user (e.g. in a mesh network). The lens array may be remotely commanded to quickly establish a new link via a second satellite, a second hub, a second gateway terminal, or either the first user or a second user. This may be accomplished by steering the first beam to the second node or by activating a second beam (e.g., the signal being summed or divided by the summer/divider 308*b*) to point to the second node while not breaking the connection to the first node. In this manner, the multiple beam lens array permits increased flexibility in satellite resource usage.

Therefore, depending on location and traffic, the system operator can establish a communication link that was previously unavailable or optimize traffic flow and resource utilization. Further, unlike fixed dish installations that may be restricted to specific beam steering angles or require expensive motorized dishes for steering, the lens array 100 can provide a low-cost alternative to dynamically and quickly steer its multiple beams to any satellites within its field of regard. While roaming may be implemented with conventional steerable reflectors and/or phased arrays, the unique low cost and multiple beam capability of the lens array 100 offer substantial economic advantages. Furthermore, because the incremental cost of adding beams to the lens array 100 is substantially lower than adding beams to conventional arrays, the lens array 100 is well suited to the addition of more beams to further extend the benefits of roaming.

Figure 4:
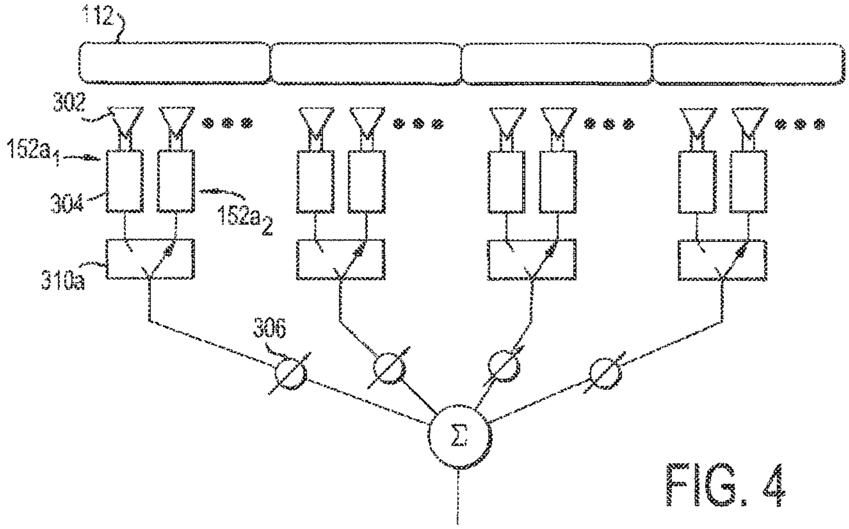
FIG. 4 is a block diagram of a lens array with single beam and switched feed selection.
Figure 6C:
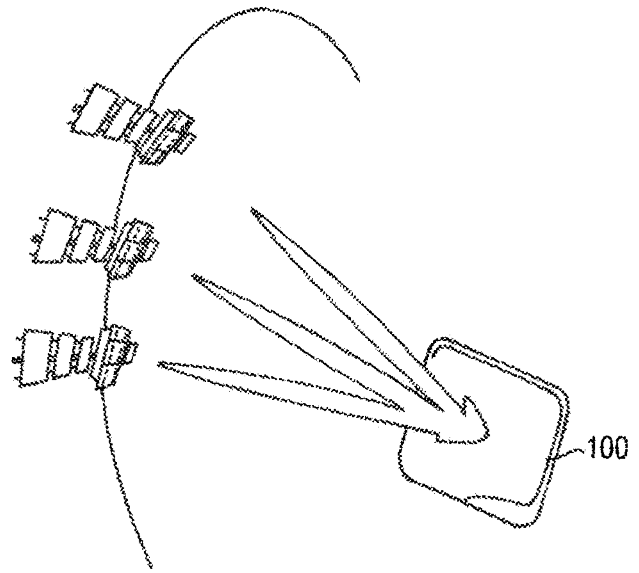
FIG. 6(*a*) is a side view of simplified beam steering by mechanically shifting the positions of a single feed element within each lens.
Figure 6D:
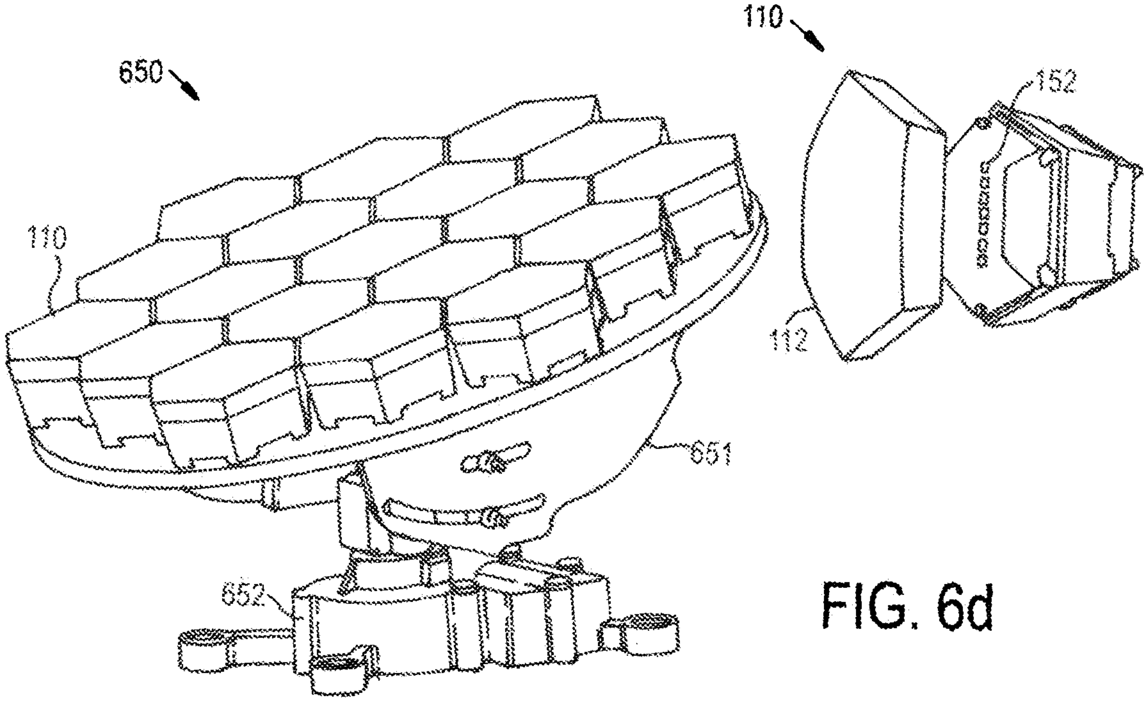
Figure 6E:
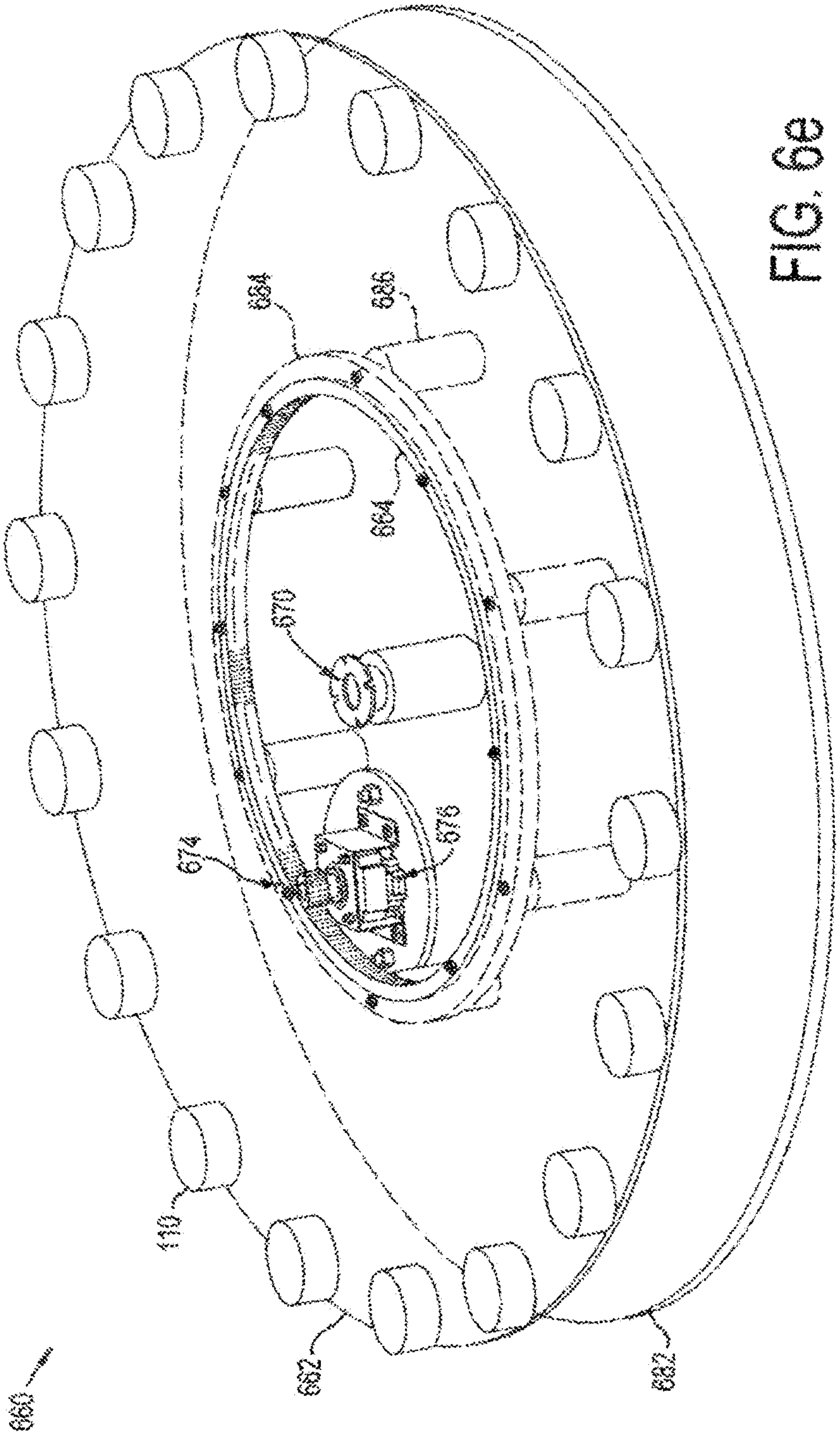
Figure 6F:
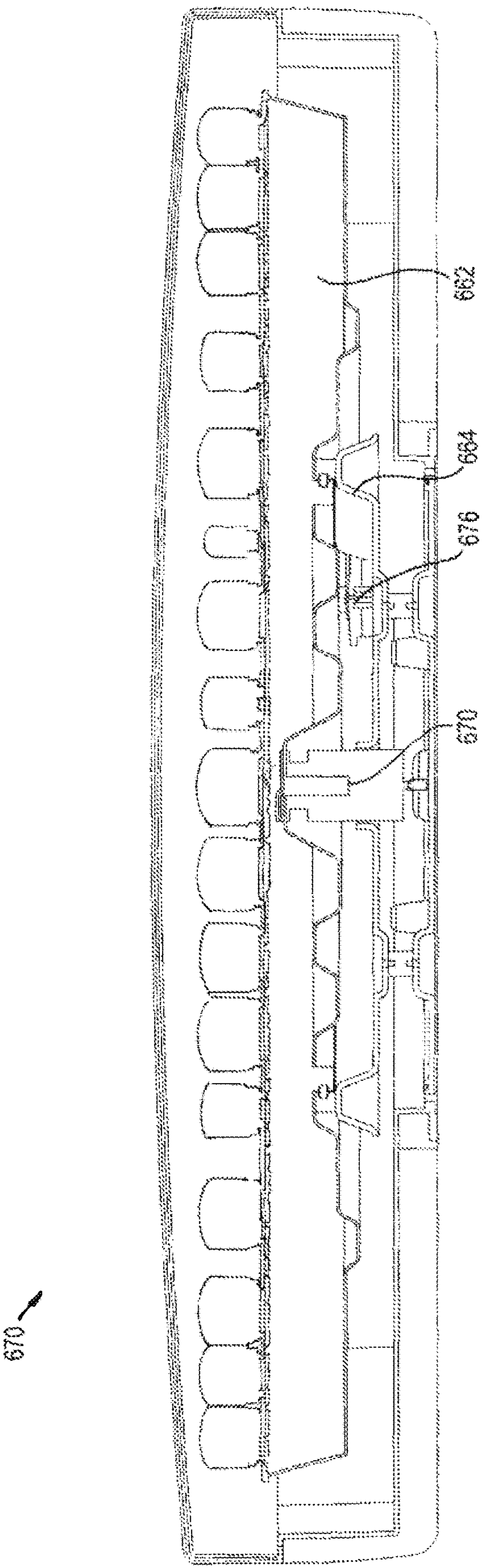

FIG. 4 illustrates how one beam phasing/time delay circuit can be used to form a single beam by incorporating one or more switches 310 at each lens 112 to select the appropriate feed element for coarse pointing and then phasing the lens feeds for fine beam pointing achieving the high directivity of the overall array. The switch 310 is coupled between the detector or sensing device 304 and the shifter 306, which may be for example a time delay circuit or a phase shift circuit. Accordingly, the signals received over the first and second feed elements 152*a*$_1$, 152*a*$_2$ share a shifter 306. The switch 310 selects which of the feed elements 152*a*$_1$, 152*a*$_2$ to connect to the shifter 306, for receiving signals and/or for transmitting signals. In one example embodiment of the invention, all of the switches 310 can operate to simultaneously select the first feed element 152*a*$_1$, 152*b*$_1$ or the second feed element 152*a*$_2$, 152*b*$_2$) of each of the feed sets 150*a*, 150*b* and pass signals between the first feed elements 152*a*$_1$, 152*b*$_1$ (or the second feed element 152*a*$_2$, 152*b*$_2$) and the summer/divider 308. Thus, the switches 310 enable one summer/divider 308 to support multiple feed elements. The shifter 306 is also controlled at the same time to provide the appropriate shift for the selected feed element 152.

In the examples of FIG. 3 and FIG. 4, coarse beam pointing of each lens 112 is obtained by the lens set circuitry selecting a specific feed element 152 (or feed location) in the focal region of each lens 112. The lens and feed combination produces a relatively broad beam consistent with the lens size in wavelengths. The direction of the beam is based on the displacement of the feed element 152 from a nominal focal point of the lens 112. By antenna circuitry combining the corresponding feed elements 152 in each lens set 110 with appropriate phase shifts or time delays, fine control of beam pointing and high directivity due to the overall array aperture size is obtained. The fine pointing of the overall array beam is accomplished with appropriate settings of the time delay or phasing circuits in accordance with criteria well known in the art for either analog or digital components. For digital time delay or phasing circuits, for example, the appropriate number of bits is chosen to achieve a specified array beam pointing accuracy.

Accordingly, FIG. 4 illustrates another example in which a feed element or a plurality of feed elements included in a lens set of a phased array is selectively activated based on a position of the feed element relative to a lens of the lens set. Therefore, a beam produced by the lens set may be adjusted without any moving parts and therefore without introducing gaps between the lens and other lenses of the array to allow for lens motion.

FIG. 5 depicts an optimized placement of the positions of the phase center of each lens set 110 to affect the symmetry/periodicity of the array 100 and thereby minimize grating lobes. Each lens 112 has a geometric center ("centroid") as well as a phase center. For lenses that are cylindrically symmetric, although the phase center is not necessarily collocated with the axis of symmetry for all scanning angles, an offset of the axis of symmetry of a particular distance and angle in the plane of the lens will correspond to the offset of the same distance and angle of the phase center, relative to the original configuration. In this way, the phase center of the lens may be adjusted by changing the location of the lens's axis of symmetry relative to the lens centroid. The phase center corresponds to a location from which spherical far-field electromagnetic waves appear to emanate. The phase center and geometric center of a lens may be independently controlled, and the phase center, not the geometric center, of each lens 112 determines a degree of grating lobe reduction.

Accordingly, a phase center 24 of each lens 112 is perturbed by optimized distances $r_i$ and rotation angles $\alpha_i$ of the lens axis of symmetry from a geometric center 20 (i.e., the unperturbed phase center) which would typically have been tiled on a uniform hexagonal or rectangular grid. The specific optimized placement of the lens axis of symmetry can be determined by any suitable technique, such as described in the Gregory reference noted above. The position of the lens axis of symmetry determines the phase center. According to the methods in the Gregory reference, for example, disturbing the periodicity of the array by small amounts in this manner suppresses the grating lobes. This process functions because grating lobes are formed by the formation of a periodic structure, which is known as a grating. By eliminating the periodicity between elements, there is no longer a regular grating structure, and grating lobes are not formed. The number of lenses, the shape or boundary of the array, the number of feeds, or the location of the feeds beneath the lens do not change the principles of this mitigation strategy.

FIGS. 6(*a*) and 6(*b*) depict a version of the lens array 100 with a relatively low parts count where only one feed element 152 per lens is included per lens set. In the example illustrated in FIGS. 6(*a*) and 6(*b*), each feed element is mechanically moved over the short range of focal distances in each lens to effect beam steering. FIG. 6(*a*) depicts a side view of the lens array 100 and FIG. 6(*b*) depicts a top down view of the lens array 100. A positioning system is provided that includes a feed support 170 and one or more actuators. The feed support 170 can be a flat plate or the like that has a same or different shape as the housing 200 and is smaller than the housing 200 so that it can move in an X- and Y-direction and/or rotate within the housing 200. The lens sets 110 are positioned over the combined feed support 170 so that the feed assembly (i.e., the feed support 170 and the feed elements 152) can be moved independently of the lenses 112. In this embodiment, the feed support 170 is not directly connected to, but is only adjacent to or in contact with, the lens spacer 114 or the lenses 112. The set of feeds 152 mounted to the feed support 170 are moved relative to the lenses to effect coarse beam scanning and the feeds are phased/time delayed to produce the full array gain and fine pointing. In the non-limiting embodiment shown, a first linear actuator 172 is connected to the support 170 to move the support 170 in a first linear direction, such as the X-direction, and a second linear actuator 174 is connected to the support 170 to move the support 170 in a second linear direction, such as the Y-direction relative to the stationary lenses. Other actuators can be provided to move the support 170 up/down (for example in FIG. 6(*a*)) with respect to the lenses 112, rotate the support 170, or tilt the support 170.

A controller can further be provided to control the actuators 172, 174 and move the feed elements 152 to a desired position with respect to the lenses 112. Though the support 170 is shown as a single board, it can be multiple boards that are all connected to common actuators to be moved simultaneously or to separate actuators so that the individual boards and lens sets 110 can be separately controlled. Accordingly, FIGS. 6(*a*) and 6(*b*) illustrate an example in which an active feed element included in a lens set of a lens array is repositioned relative to a lens of the lens set without moving the lens. Therefore, a beam produced by the lens set may be adjusted without moving the lens and introducing gaps between the lens and other lenses of the phased array.

The lens array of FIGS. 6(*a*) and 6(*b*) may be realized as a highly simplified lens array 100 where each lens 110 has only a single feed and the entire ensemble of feeds is steered by simply mechanically moving the entire array 100. This concept allows the possibility of a truly consumer priced terminal that oilers easy user installation without needing a highly accurate physical pointing of the aperture. In one example, such a terminal could be used for TV reception and/or two-way communications with geostationary orbit (GEO) satellites. Moreover, once installed, the terminal can be pointed by electronic control to other satellites within the antenna's field of regard as shown symbolically in FIG. 6(*c*).

Installation may be done as follows. The user is given an initial set of pointing coordinates and adjust simple azimuth and elevation fixtures on the terminal very similar to that of typical direct broadcast satellite reflectors and well known in the industry. The primary difference is that, in this case, the pointing need not be precise and can have errors of several degrees. The simple beam steering of the lens array selects the optimal feed positions behind each lens to automatically point and acquire the satellite. Further steering within a limited field of regard may allow acquisition of other satellites by simple command, such as that provided by an indoor unit or set-top box. There are significant advantages of this approach relative to conventional steerable arrays, including lower initial hardware cost, easy installation and initial pointing by the consumer, and automatic acquisition of the satellite signals. Furthermore, the lens array 100 should also reduce the incidence of service calls due to the automatic signal acquisition and generous allowance for initial pointing errors.

As described above, the lens array 100 may alternatively be realized as a phased array which, when populated with multiple feeds in multiple positions, provides two-dimensional electronic beam steering. In order to reduce cost even further, the lens array 100 may be incorporated into an antenna 650 that limits the electronic steering to substantially one plane (e.g., the elevation plane) as shown in FIG. 6(*d*). As shown in FIG. 6(*d*), the antenna 650 includes hybrid electromechanical beam steering. For example, the elevation angle may be set by means of a tilt apparatus 651 that may be adjusted upon installation for application to a particular satellite coverage region. The antenna 650 also uses electronic beam steering in the elevation plane by switching among feeds 152 behind each lens 112 as described above and then summing the contributions of the lenses. Full azimuth steering is obtained by mechanically rotating the aperture in azimuth with the rotation device 652, for example using a motor. The feed configuration is vastly simplified, as the feed group of each lens set 110 is only a single line of feeds 152 that are substantially parallel to the axis of rotation of the rotation device 652. The result is a uniquely low-cost antenna system that provides a wide angular coverage in elevation and azimuth.

As an alternative to the hybrid electromechanical beam steering antenna 650, a hybrid electromechanical beam steering antenna 660 may include a rotation system, for example as shown in FIGS. 6(*e*) and 6(*f*). As shown, the rotation system includes a base 682, a rotating tray 662, and a stewing bearing that includes an outer ring 684 and an inner ring 664. The rotating tray 662 and the base 682 are each a solid thin planar circular plate or disk, and the plane of the rotating tray 662 is substantially parallel to the plane of the base 682. The outer ring 684 is slidably engaged with and rotates with respect to the inner ring 664. The outer ring 684 can be substantially concentric with or offset from (e.g., lower or higher than) the inner ring 664. The outer ring 684 is connected to the base 682 by supports 686, and the inner ring 664 is connected to the rotating tray 662. The inner ring 664 rotates around a central axis relative to the outer ring 684, causing the rotating tray 662 to rotate relative to the base 682. The inner ring 664 includes inwardly-facing gear teeth. The rotation system includes a motor 676 with a gear 674 that interfaces with the gear teeth of the inner ring 664. The motor 676 rotationally drives the gear 674, which rotates the rotating tray 662 with respect to the base 682.

The antenna 660 includes lens sets 110 mounted to the top outer surface of the rotating tray 662. In one embodiment, the lens sets 110 extend outward at the outer perimeter of the rotating tray 662. A slip ring 670 provides an opening for wires that pass digital, power, and RF signals across a rotating joint to the lens sets 110, via a respective opening in the rotating tray 662. The base 682 remains stationary and the direction of the beam is set by rotating the rotating tray 662, including the lens sets 110. The elevation (vertical angle) is set by electronically switching among feeds within each of the lens sets 110.

The rotation system can be combined with the tilt feature 651 of FIG. 6(*d*) to form a lens array that is mechanically scanned in one axis and mechanically scanned in the other, and where the center angle of the electrically-steered axis can be adjusted to select the direction of peak gain to be boresight or another angle. The rotation device includes a support 652. The tilt apparatus 651 is mounted to the base 652 and can include a plate with arcuate slots. The lens sets 110 can have a support plate (such as in FIGS. 6(*e*)-(*f*). Pins or rods can pass from the support plate into the slots of the tilt plate, and a motor can rotate the support plate with respect to the base 652.

Figure 7:
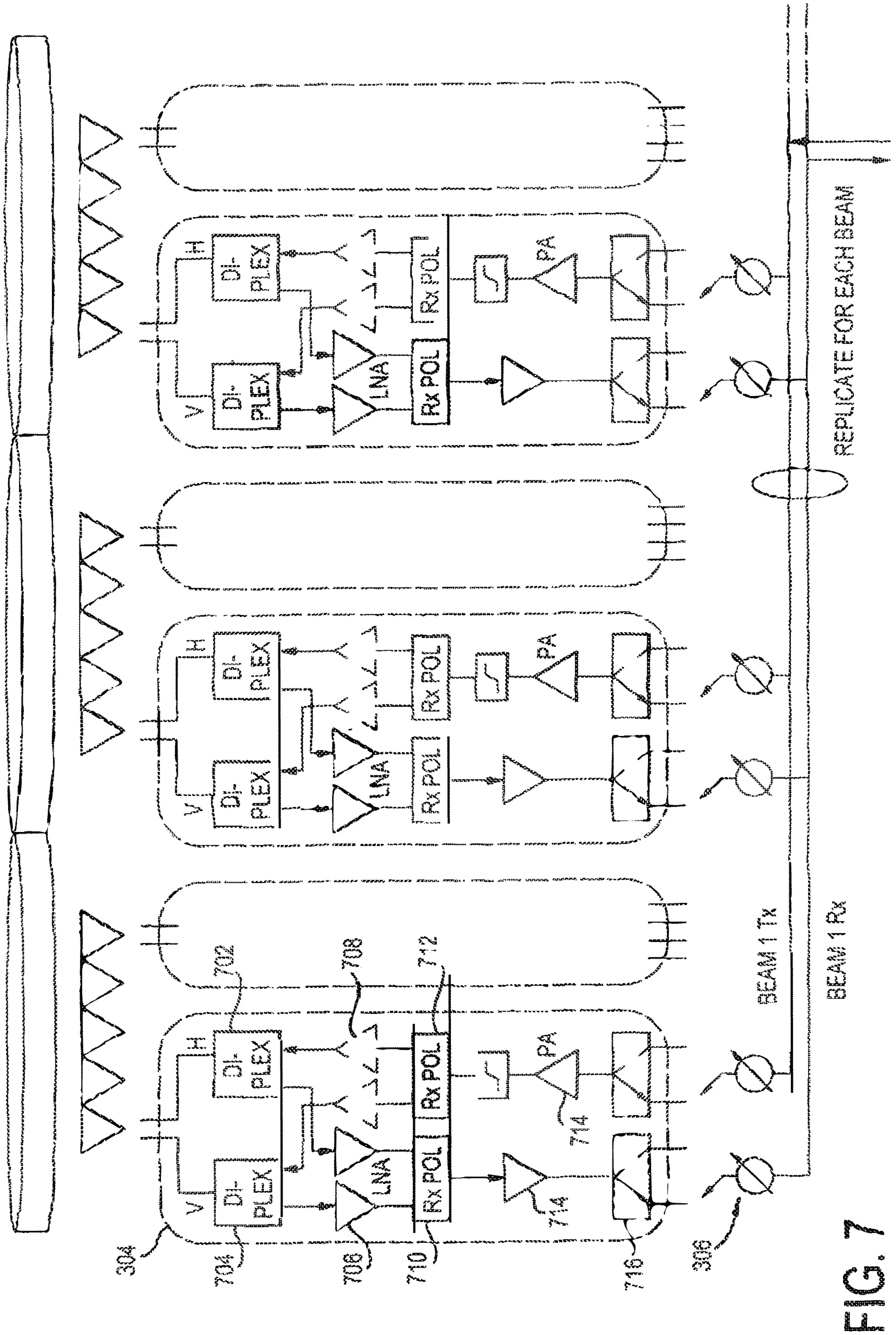
FIG. 7 is a functional block diagram of transmit-receive circuit for dual linear polarization lens feed.

FIG. 7 shows representative circuit diagrams for simultaneous transmit (Tx) and receive (Rx) in the same aperture including dual linear polarization tilt angle control as would be required for Ku-band geostationary Satcom applications. The beam phasing circuits at the bottom can be replicated for each independent simultaneous beam. FIG. 7 illustrates independent signal paths within the lens set circuitry 304 and separate shifters 306 for the receive and transmit operation of the system. While not illustrated, the receive and transmit operations may further have separate associated summers/dividers 308. In the illustrated example, the detector 304 in each feed element 152 includes separate diplexers 702 and 704 for horizontal and vertical polarized feed ports of the detector 304 to separate high-power transmit and low-power receive signals. The receive signal passes from the diplexers 702 and 704 to the low-noise amplifier 706, 706, a polarization tilt circuit 710, 712, an additional amplifier 714, and the feed-select switch 716 before reaching the shifter 306. The transmit signal from the shifter 306 passes through the switch 716, the amplifier 714, a polarization tilt circuit 712, 710, and a final power amplifier 708, 706 before being fed into the two diplexers 702 and 704, respectively.

Figure 8:
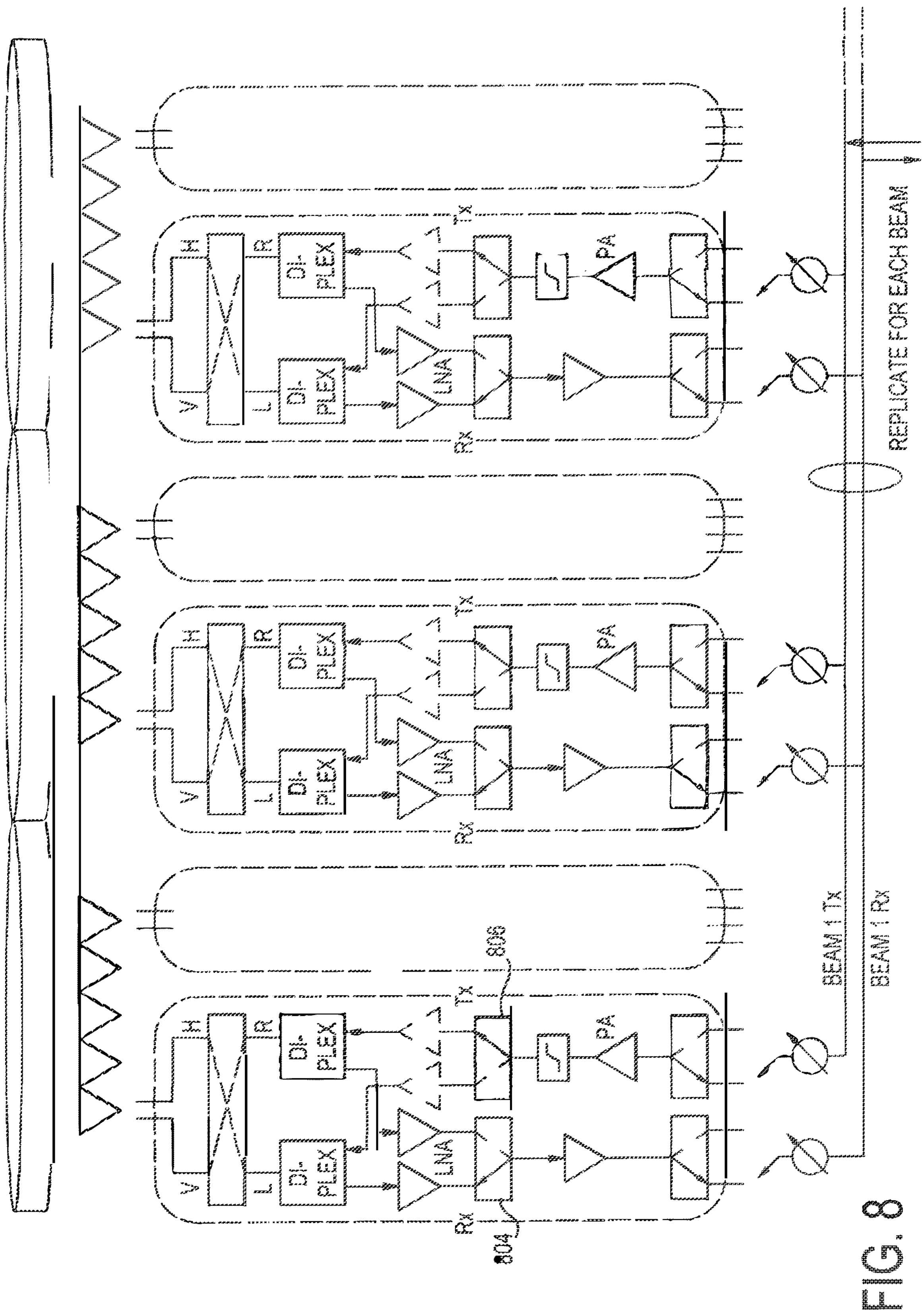
FIG. 8 is a block diagram of transmit-receive circuit for dual circular polarization lens feed.

FIG. 8 is a representative circuit diagram for a lens array of dual circularly polarized elements such as may be used for K/Ka-band commercial Satcom frequencies. FIG. 8 shows a similar diagram to FIG. 7, except for a change in operation of the polarization circuits 710, 712. K/Ka Satcom operation requires circular polarization, rather than tilted linear polarization as required for Satcom operation at Ku. Right-hand circularly-polarized or left-hand circularly-polarized signals may be achieved with a simple switch 804 for the receive and 806 for the transmit channels controlling which port is excited in a circular polarizer circuit or waveguide component, as compared to the complex magnitude and phase vector adding circuits 710 and 712 to achieve a linear polarized signal with an arbitrary tilt angle. The remaining aspects of the diagram are the same as in FIG. 7. Variations of this circuit may be understood by those skilled in the art. For example, feeding the two orthogonal linear polarization components of the feed using a hybrid coupler or an incorporated waveguide polarizer and orthogonal mode transducer (OMT) can provide simultaneous dual polarizations instead of switched polarizations.

Figure 9A:
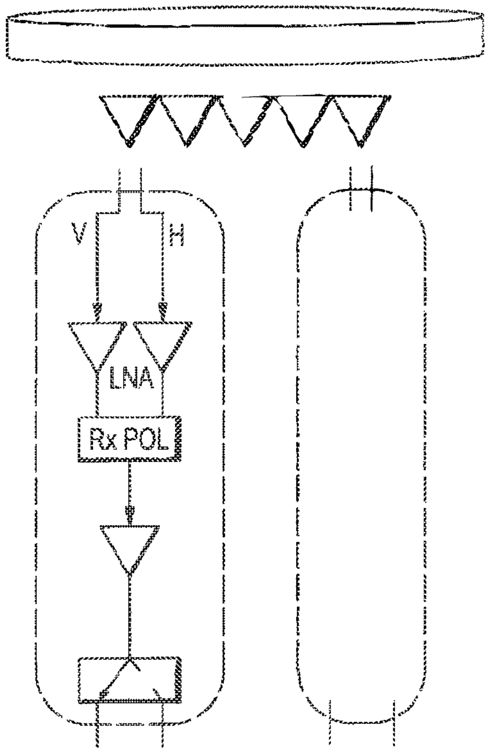
FIG. 9(*a*) is a block diagram for a receive-only circuit for the lens feed.
Figure 9B:
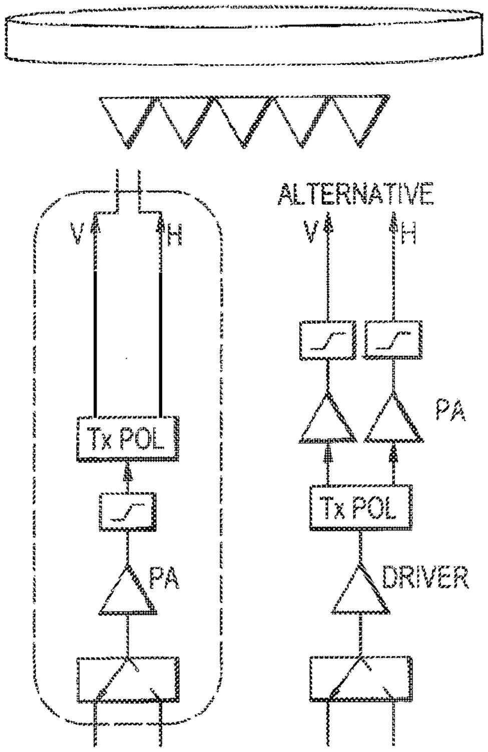

FIG. 9 illustrates representative lens set circuitry for receive-only and transmit-only applications. FIG. 9(*a*) illustrates a receive-only antenna and FIG. 9(*b*) illustrates a transmit only antenna. The receive and transmit diplexers 702 and 704 are not required for a receive-only or transmit-only antenna, since the receive and transmit signals are not connected to the same feed element and do not need to be separated. The remaining aspects of FIG. 9(*a*) and FIG. 9(*b*) remain substantially the same as FIGS. 7-8.

Figure 10:
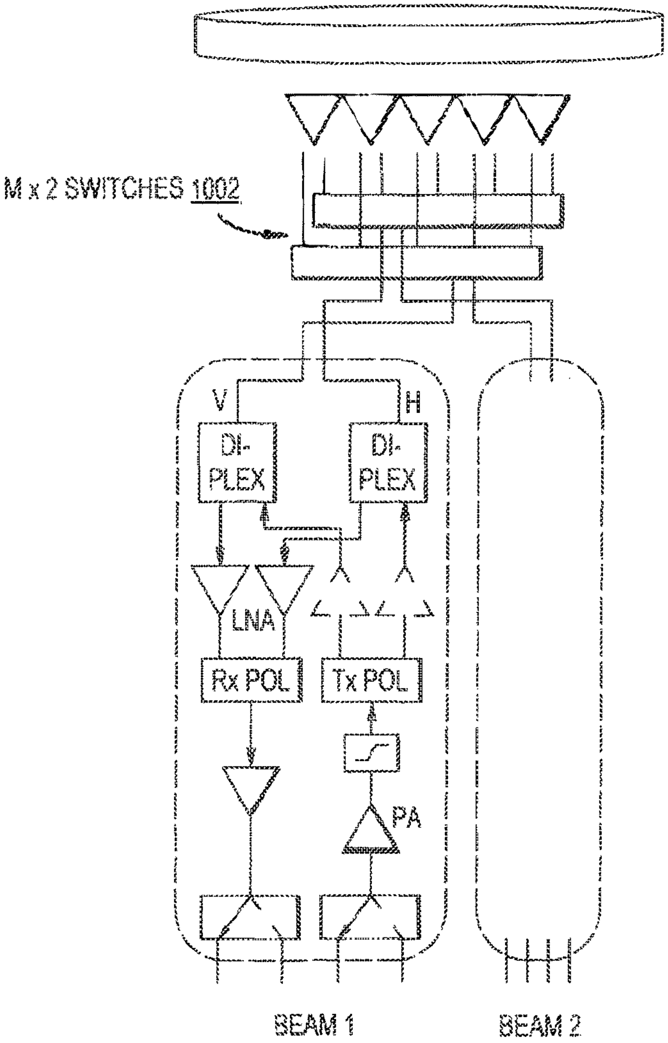
FIG. 10 is a functional block diagram for switch circuit to select feed.

FIG. 10 shows a further simplification and reduction in parts count by incorporating low-loss multi-port switches 1002 to select the appropriate feed element. The use of low-loss multi-port switches allows multiple feed elements to share a single set of power amplifiers, low-noise amplifiers, phase shifters, and other feed circuitry. In this way, the number of required circuit components is reduced while maintaining the same number of feed elements behind the lens. A larger switching matrix allows more feed elements to share the same feed circuitry, but also increases the insertion loss of the system, increases the receiver noise temperature, and decreases the terminal performance. A balance between the additional losses incurred by an additional level of switching, which generally (although not necessarily) is a two-to-one switch, must be balanced against the cost and circuit area of the additional receive and transmit circuits required when it is omitted.

Figure 11A:
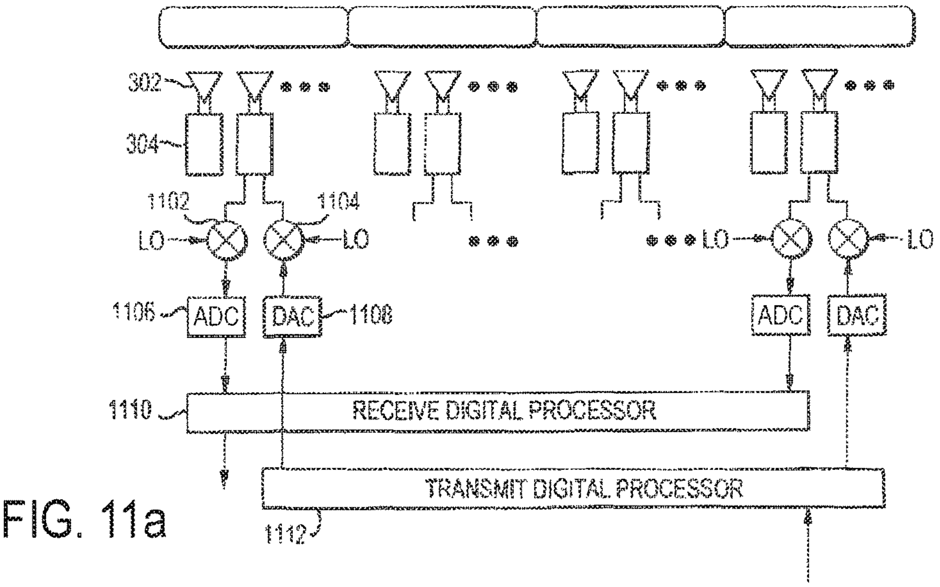
FIG. 11(*a*) is a functional block diagram for circuit implementation in the digital domain for digital beam processing.
Figure 11B:
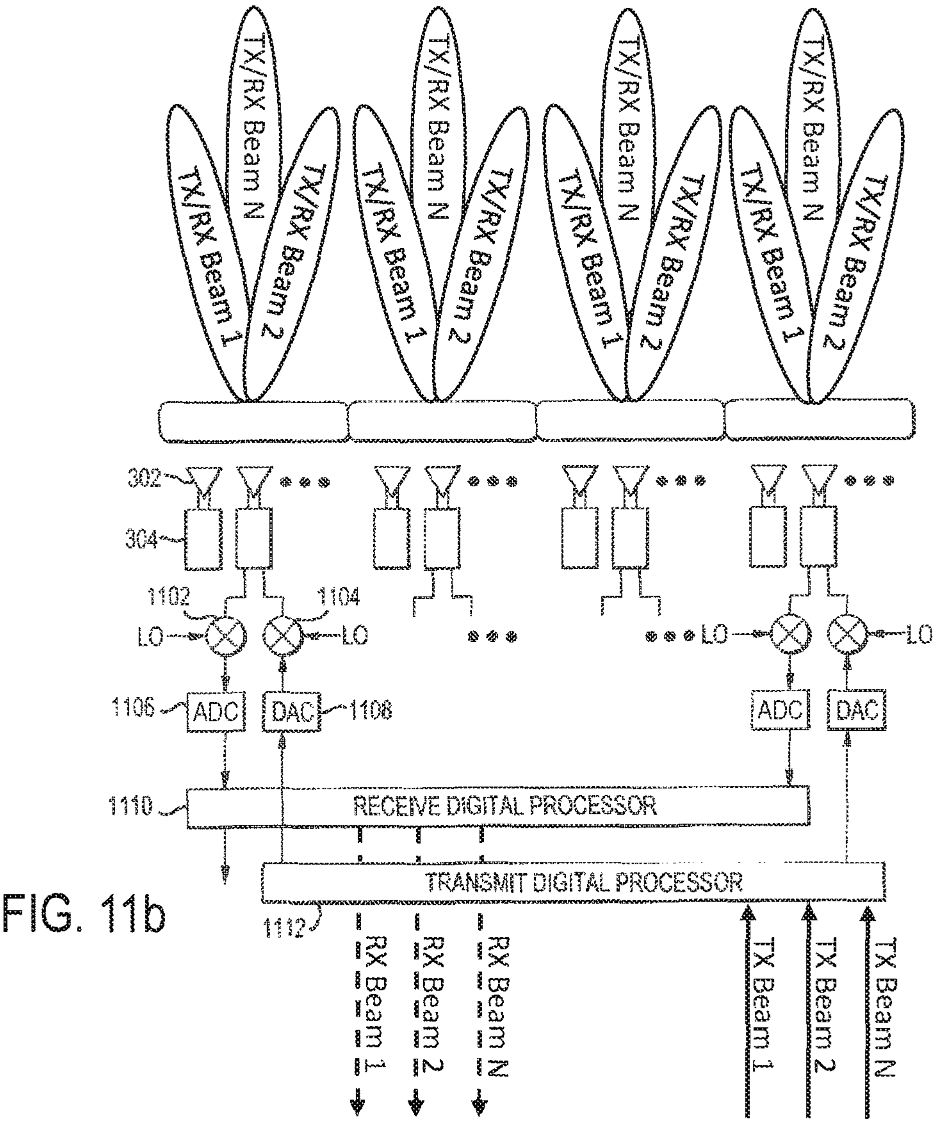

FIG. 11(*a*) depicts a simplified digital beamforming (DBF) arrangement. The detector 304 is connected to a down-converter 1102. An Analog-to-Digital converter (ADC) 1110 is connected to the down-converter 1102. The detector 304 transmits a signal received via the antenna 302 to the down-converter 1102, which down-converts the signal. The down-converter 1102 transmits the down-converted received signal to the ADC 1106. The ADC 1106 digitizes the received signal and forms a beam in the digital domain, thereby obviating the need for analog RF phase or time delay devices (i.e., the shifter 306 of FIGS. 2-3 need not be provided). The digitized signal is then transmitted to a Receive Digital Processor 1110 for processing of the signal.

A corresponding process is provided to transmit a signal over the array. A Transmit Digital Processor 1112 sends the signal to be transmitted to a Digital-to-Analog Converter (DAC) 1108. The DAC 1108 converts low frequency (or possibly baseband) bits to an analog intermediate frequency (IF) and is connected to a mixer 1104. The mixer 1104 up-converts the signal from the DAC 1108 to RF, amplifies the signal for transmit, and sends the signals to the feed elements with the appropriate phase (e.g., selected by the transmit digital processor 1112) to form a beam in the desired direction. Many variations evident to those skilled in the art may be employed while maintaining the unique features of the invention.

Significant improvements to the cost, reliability, and flexibility of phased arrays may be realized by implementing a fully digital processing architecture, particularly as Digital Signal Processing (DSP) technology advances and costs are reduced. While DBF has been known in the art for phased arrays, sometimes called "smart antennas", the cost of incorporating DSP technology to a conventional phased array is high because of the need for a large number of DSP circuits. Meanwhile, however, the lens array 100 requires fewer parts to incorporate DSP technology.

DSP allows considerable reduction or elimination of most of the analog beamforming circuits, generally except for the receive and transmit amplifiers. Most of the circuitry can be replaced by Digital-to-Analog Converters (DAC) and Analog-to-Digital Converters (ADC) with the necessary functions such as combining, time delay for beam steering, and beam formation performed in the digital domain by computer processors. In these architectures, broad instantaneous bandwidth is maintained due to time delay processing in the digital domain. Furthermore, digital beamforming is well suited to Time Division Duplex (TDD), Frequency Division Duplex (FDD) as well as the access schemes such Time Division Multiple Access (TDMA), Frequency Division Multiple Access (FDMA), Code Division Multiple Access (CDMA) etc.

FIG. 11(*b*) illustrates an example block diagram for multiple beam digital beamforming, expanding on that of FIG. 11(*a*). In particular, FIG. 11(*b*) shows more explicitly the extension of capability to that of multiple beam capability for transmit and receive of using Digital Signal Processing. While three beams (beam 1, beam 2, and beam N) are shown as an example, FIG. 11(*b*) is not meant to express a limitation on the number of beams.

Figure 12:
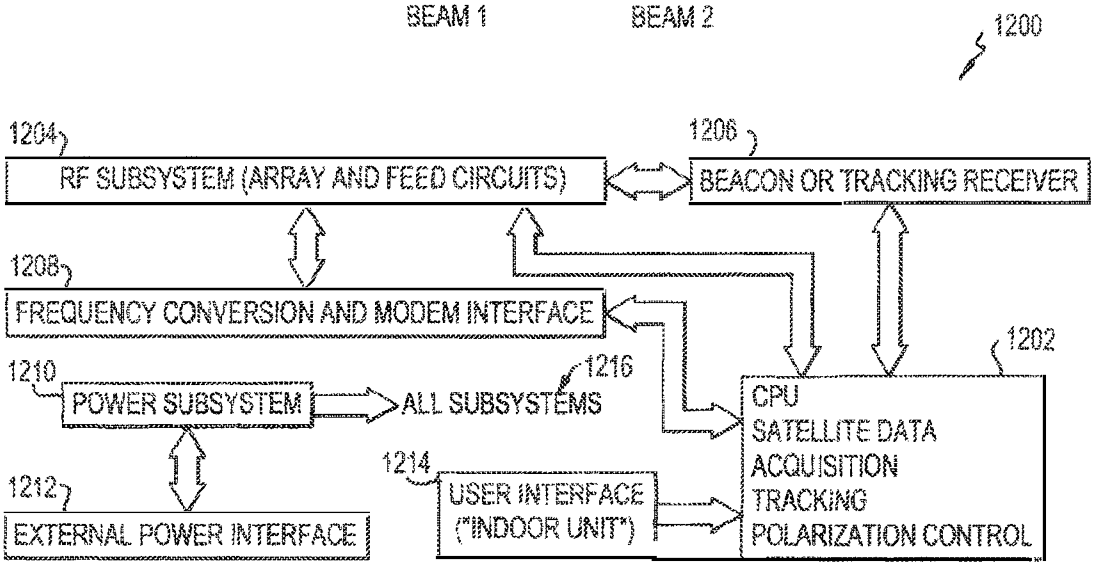
FIG. 12 is a system diagram for a Satcom terminal.

FIG. 12 is a simplified functional collection of subsystems that allow a lens array antenna to be incorporated in a fully functional tracking terminal for Satcom-on-the-move or for tracking non-geostationary satellites. Here, a system 1200 includes a processing device 1202 such as a Central Processing Unit (CPU), beacon or tracking receiver 1206, Radio Frequency (RF) Subsystem 1204, Frequency Conversion and Modem Interface 1208, Power Subsystem 1210, External Power Interface 1212, User Interface 1214, and other subsystems 1216. The RF Subsystem 1204 array may include any of the array and feed circuits of FIGS. 1-11 as described herein. The processing device 1202, beacon or tracking receiver 1206, modem interface 1208, power subsystem 1210, external power interface 1212, user interface 1214, and other subsystems 1216 are implemented as in any standard SATCOM terminal, using similar interfaces and connections to the RF subsystem 1204 as would be used by other implementations of the RF subsystem, such as a gimbaled reflector antenna or conventional phased array antenna. As shown, all the components 1202-1214 can communicate with one another, either directly or via the processing device 1202. Accordingly, FIG. 12 illustrates one context in which multiple beam phased array antenna systems, as described herein, may be integrated.

Because the lens array 100 requires fewer feed elements 152 and electrical/RF components, satellite communication terminals employing the lens array 100 have fewer space constraints. That extra space may be used to include additional components to form a fully integrated communications terminal. For example, most (mobile and stationary) satellite communication terminals consist of an outdoor unit (ODU) and an indoor unit (DU). The ODU typically converts the radio frequency (RF) signals to and from an intermediate frequency (I-F) and one or more cables carry the I-F signals between the ODU and IDU where they interface with the indoor modem. However, as shown in FIG. 13(*a*), the compact, low-profile package of the lens array 100 is uniquely well suited to an innovation that fully integrates multiple modems into the ODU that results in a complete ODU multiple beam communications terminal.

Figure 13A:
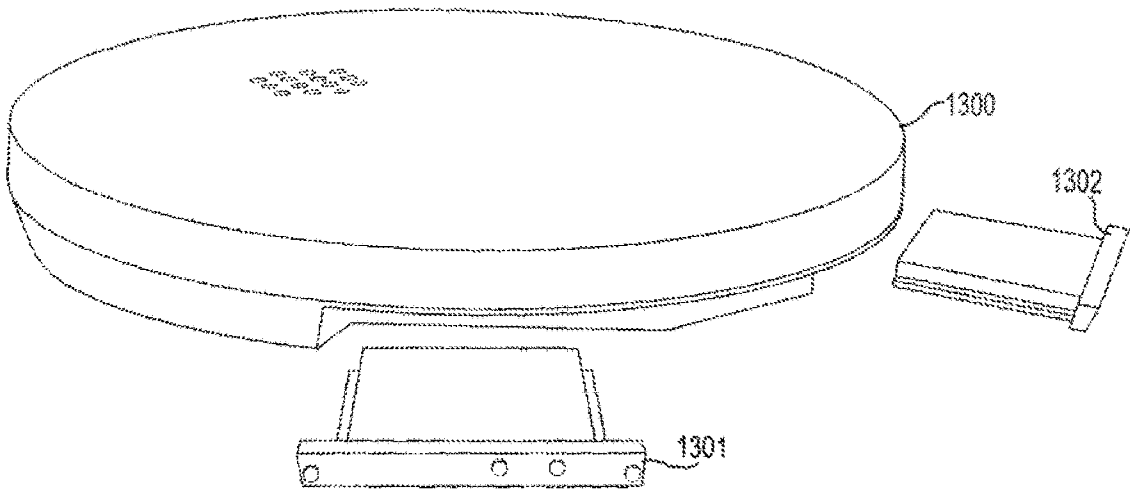
FIG. 13(*a*) is a view of an integrated communications terminal.
Figure 13B:
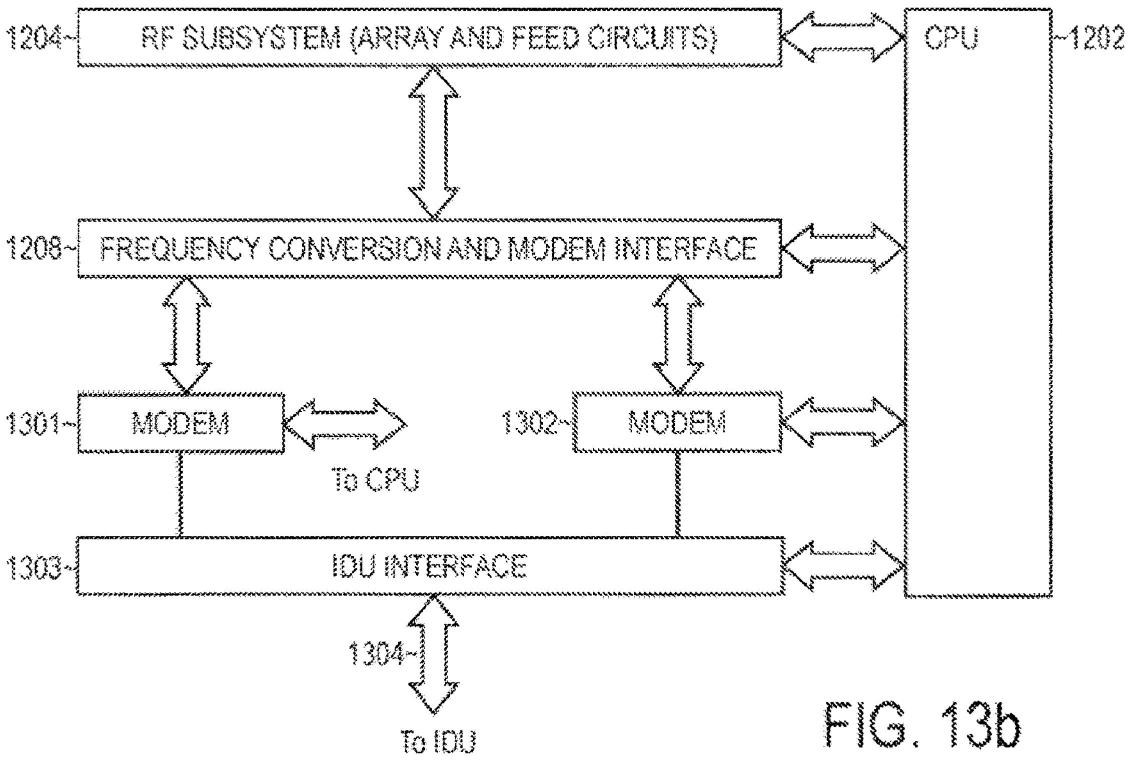

As shown in FIG. 13(*a*), one or more modems 1301 and 1302 may be integrated with an array terminal 1300 as circuit cards, for example in removable drawers. Each modem 1301 and 1302 may be associated with an individual steerable beam of the multiple beam antenna. For example, the modem 1301 may be connected with the RF and downconversion circuitry of the signal being summed or divided by the summer/divider 308*a* (as shown in FIG. 3) and the modem 1302 may be connected with the RF and downconversion circuitry of the signal being summed or divided by the summer/divider 308*b*. Although two modems 1301 and 1302 are shown, the compact multiple beam lens array 100 can accommodate a larger number of modems. The modems 1301 and 1302 can be similar or even of different designs or, for example, from different modem suppliers.

FIG. 13(*b*) is a block diagram of the array terminal 1300. As shown in FIG. 13(*b*), the array terminal 1300 includes components of the system 1200, including the processing device 1202, the RF subsystem 1203, and the frequency conversion and modem interface 1208. However, the compact design of the lens array 100 allows the array terminal 1300 to also include the modem 1301 and the modem 1302, which each bidirectionally communicate with the processing device 1202. In this manner, only power and, for example, Ethernet, wireless, or other IDU interface connections 1403 and/or 1404 need be made to the ODU.

Because each of the modems 1301 and 1302 interface with the antenna acquisition and control system (i.e., the processing device 1202) via standardized connections among various modem designs, the array terminal 1300 may allow simplified substitution of modems for different applications. The processing device 1202 exchanges all the necessary information with the modems 1301 and 1302 and the antenna subsystem 1204, including satellite transmission and reception modulation and coding, transmit power levels, cessation of emissions for tracking errors, etc. The result is a fully integrated ODU that is controllable and that processes signals all the way to the baseband level.

Figure 14:
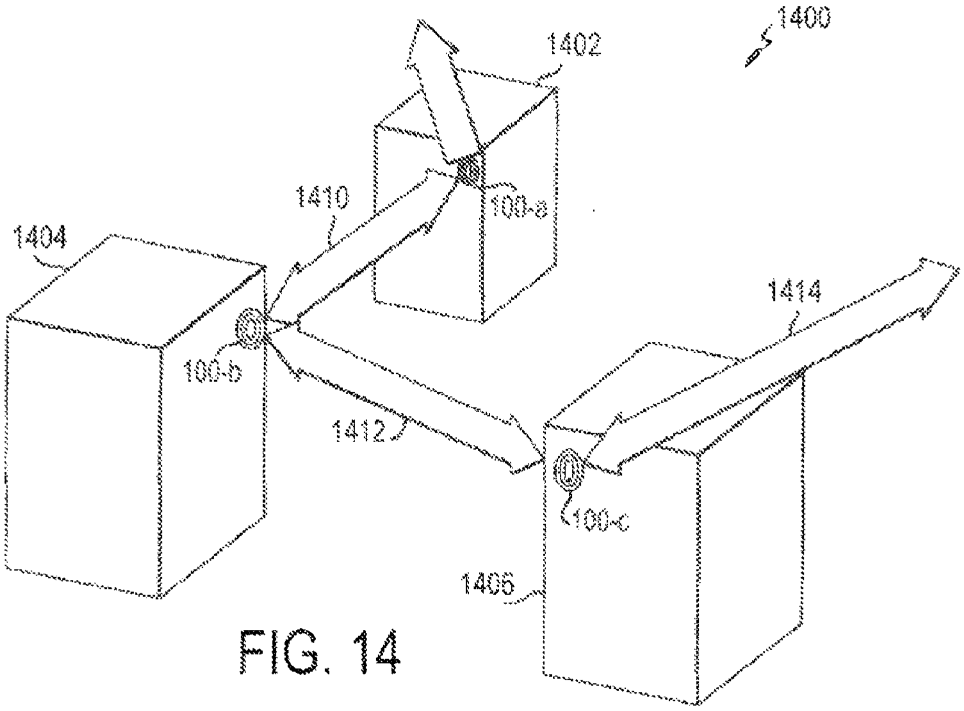
FIG. 14 is a diagram for a wireless point-to-multipoint terrestrial terminal.

FIG. 14 demonstrates the use of multiple lens-based antenna terminals in a terrestrial context. Based on dynamic, real-time conditions and communication demands, the terminals can re-point their beams to establish simultaneous communications with multiple targets to form a mesh or self-healing network. In such a network, multiple antenna terminals 100*a-c* located on locations 1402, 1404 and 1406, which may be buildings, towers, mountains, or other mounting locations can dynamically establish point-point high-directivity communication links 1410, 1412, and 1414 shown as broad bidirectional arrows between themselves in response to communication requests or changing environmental conditions. For example, if antennas 100*a* and 100*b* are communicating over link 1410, but the link is interrupted, the communications path can reform using links 1412 and 1414 using antennas 100-*b* and 100-*c*. This allows the use of highly-directional antennas in a mesh network, which will improve signal-to-noise ratio, power levels, communication range, power consumption, data throughput, and communication security compared to a mesh network composed of conventional omnidirectional elements.

In addition to terrestrial (e.g., ground-based, atmospheric, and maritime) applications, the compact design of the lens array 100 is also particularly well suited for space-based applications. Most modern satellites in earth orbit use multiple beams to provide communications links to users over the satellite's coverage area. To date, many of these links have been formed by reflectors with multiple feeds. A phased array (that can be electronically steered without any moving parts) is particularly advantageous in space-based applications because any movement can cause an entire satellite to rotate unless an equal and opposite force is also applied. However, the cost of space-based phased arrays have limited their application to government or military use rather than commercial entities. With the emphasis on new constellations with small satellites in medium or low earth orbit, the lens array 100 can provide a flexible, low-cost alternative to conventional phased arrays and permit satellite architectures that can provide multiple electronically steerable beams. Furthermore, combined with digital processing, the architectures may allow user-centric beam formation rather that the generally inflexible fixed beams or slowly steered beams of conventional antenna architectures. The lens array 100 is very cost effective and represents a good solution for non-GEO systems, providing a compact packaging of an array.

Figure 15A:
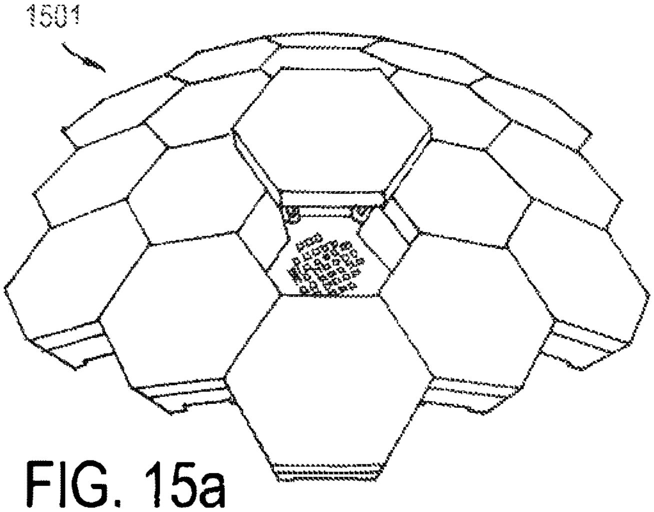
FIGS. 15(*a*), (*b*) are views of exemplary non-planar and conformal arrays.
Figure 15B:
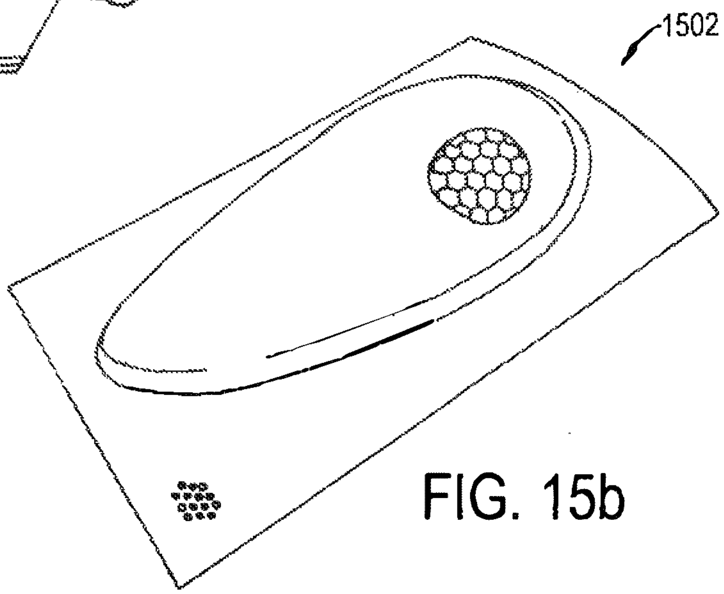

As stated above, the lens array 100 need not be a planar or flat array but can be configured in a variety of non-planar arrangements. FIGS. 15(*a*), (*b*) illustrate two examples of conformal or non-planar arrays, including a domed array 1501 (FIG. 15(*a*)) and an array 1502 configured to conform to the inner surface of an aerodynamic radome having the shape of a teardrop (FIG. 15(*b*)), with a cut-away to show the lens sets at the interior of the radome. The non-planar arrays may, for example, be used to increase the overall field of regard to provide coverage to very low elevation angles. Such extremely wide fields of regard may be beneficial to antennas mounted on certain vehicles such as aircraft and maritime vessels where the attitude (e.g. roll, pitch, and yaw) of the vehicle must be considered. It is readily appreciated that even though the lenses are non-spherical (e.g., flat), the lens sets can be utilized on non-planar arrangements, and other non-planar arrangements may be used. The lens sets can be about 4-20 cm in width and height, depending on the desired frequencies, and can be mounted at the inner top surface to maximize the achievable gain and improve the field of regard. The compact, low-cost array of lens elements affords a unique economical solution for very wide angular coverage.

Multi-Band Antennas

As described above, the use of lenses 112 increases the aperture efficiency and gain of the lens array 100, enabling the lens array 100 to use fewer feed elements 152 (and associated RF/electrical circuitry). The need for fewer parts allows the lens array 100 to have a smaller footprint than a conventional phased array while maintaining aperture efficiency and gain.

In some arrangements and orientations, the lens sets 110 of a lens array 100 may be spaced apart such that there are gaps between the lens sets 110. This extra space makes it possible for the lens array 100 to include a second antenna array, designed for a much lower band, with the elements interspersed in the gaps between the lens sets 110 of the lens array 100.

A multi-band lens antenna could be used, for example, to produce a hybrid Ka/L-band aperture or Ku/L-band aperture, with sub-wavelength spacing of the lower-frequency L-band antennas fitting naturally into the spaces between the higher-frequency (e.g., Ka-band or Ku-band) lens sets 110. Selecting the size of the lenses 112 and spacing then becomes a factor in selecting the operational frequency, element spacing, and aperture size of the low-frequency array. Depending on the arrangement of the lenses 112, different elements would be appropriate to be interspersed. If the gaps between the lenses 112 are minimal, the second (lower-frequency) antenna array may include flat antennas or wire elements (e.g., PCB Vivaldi antennas, dipoles, etc.) disposed in the gaps between the lenses 112. If the gaps between the lenses are larger, then the second (lower-frequency) antenna array may include electrically-small planar antennas (e.g., dielectric-loaded patch antennas) disposed in the gaps between lenses 112.

Figure 16:
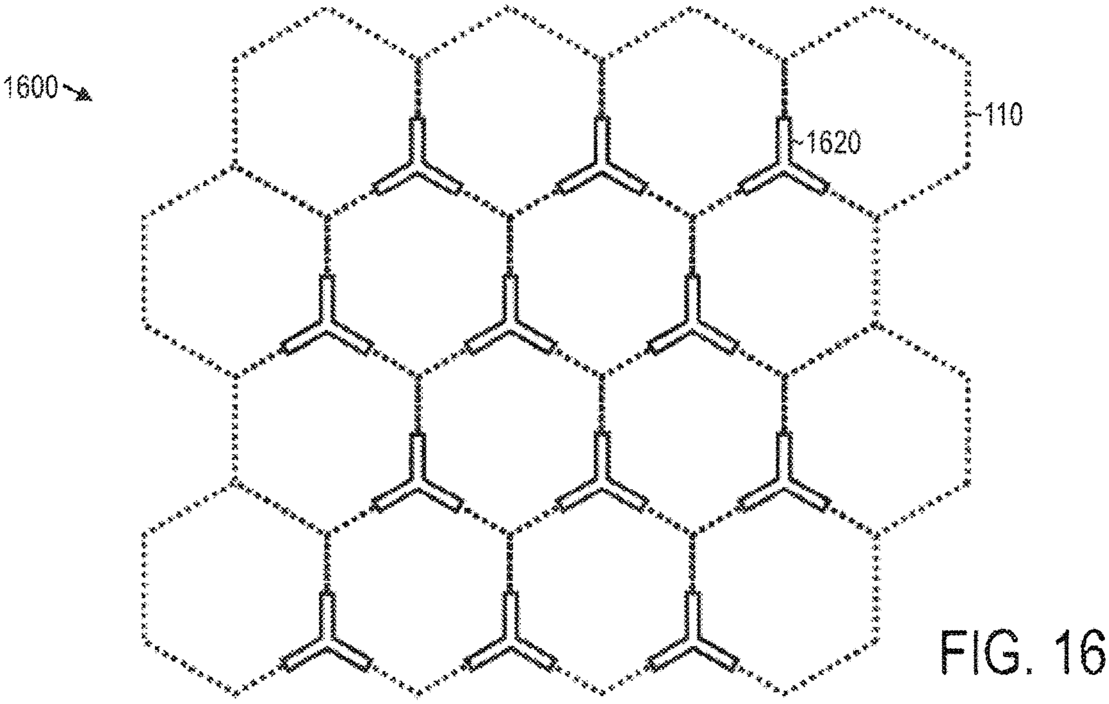
FIG. 16 is a diagram of an exemplary multi-band lens antenna.

FIG. 16 illustrates an exemplary multi-band lens antenna 1600. As shown in FIG. 16, the multi-band lens antenna 1600 includes a first antenna array that includes the hexagonal-shaped lens sets 110 described above with reference to other single band embodiments. As described above, the lenses 112 of the first antenna array may be non-spherical (e.g., flat). The multi-band lens antenna 1600 also includes a second antenna array with lower-frequency antenna elements 1620 disposed in the gaps between the lens sets 110. For example, the antenna elements 1620 may be wire antennas (e.g., dipoles, tripoles, etc.). The antenna elements 1620 may have one or more elongated wire legs. As shown, the antenna elements 1620 may have three legs that are each approximately 120 degrees apart and joined at the center and extend out from the center, to fit between three adjacent lens sets 110, Each row of lens sets 110 may be offset from the neighboring row by half the width of the lens set 110, so that the top center point of each hexagonal lens 112 rests between the two lens sets 110 in the row above it, separated by the low frequency antenna element 1620.

The multi-band lens antenna 1600 may be mechanically steerable in at least one dimension. Accordingly, the beams of the first antenna array and the second antenna array may be mechanically steerable. Additionally or alternatively, either or both of the first antenna array and the second antenna array may be a phased array. Accordingly, the first antenna array may be electrically steerable (in one or two dimensions) independent of the second antenna array. Similarly, the second antenna array may be electrically steerable (in one or two dimensions) independent of the first antenna array.

Figure 17:
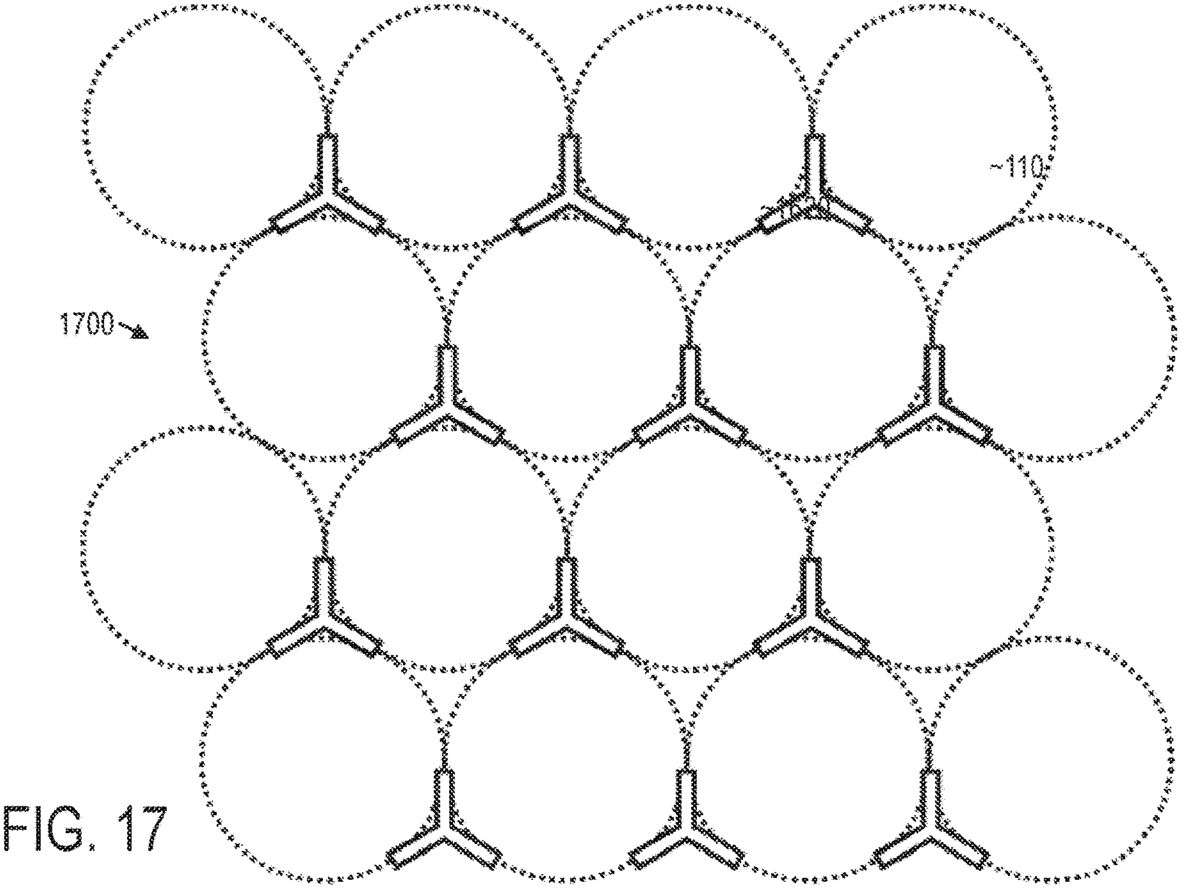
FIG. 17 is a diagram of another exemplary multi-band lens antenna.

FIG. 17 illustrates another exemplary multi-band lens antenna 1700. As shown in FIG. 17, the multi-band lens antenna 1700 includes circular shaped lens sets 110 and lower-frequency antenna elements 1620 (e.g., wire antennas) positioned therebetween.

Figure 18:
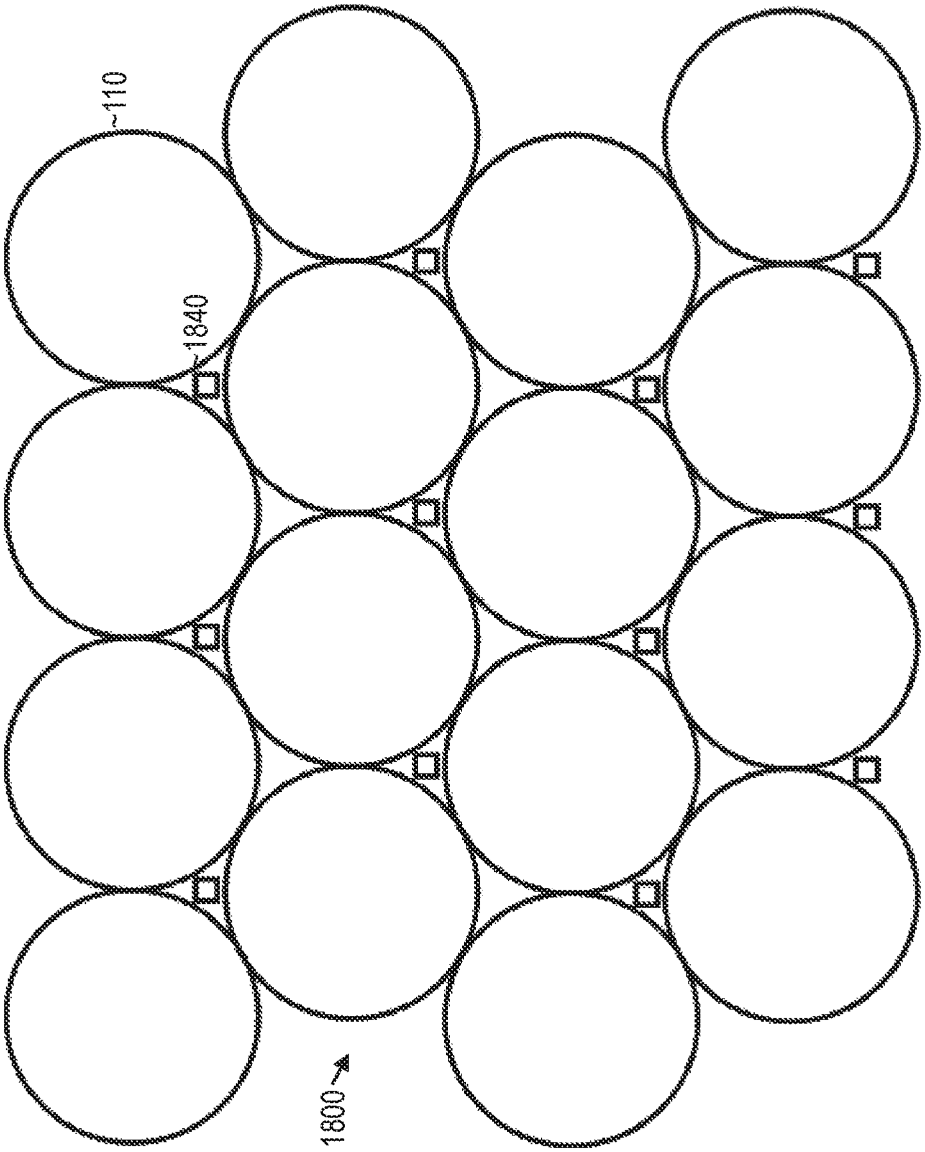
FIG. 18 is a diagram of another exemplary multi-band lens antenna.
Figure 19:
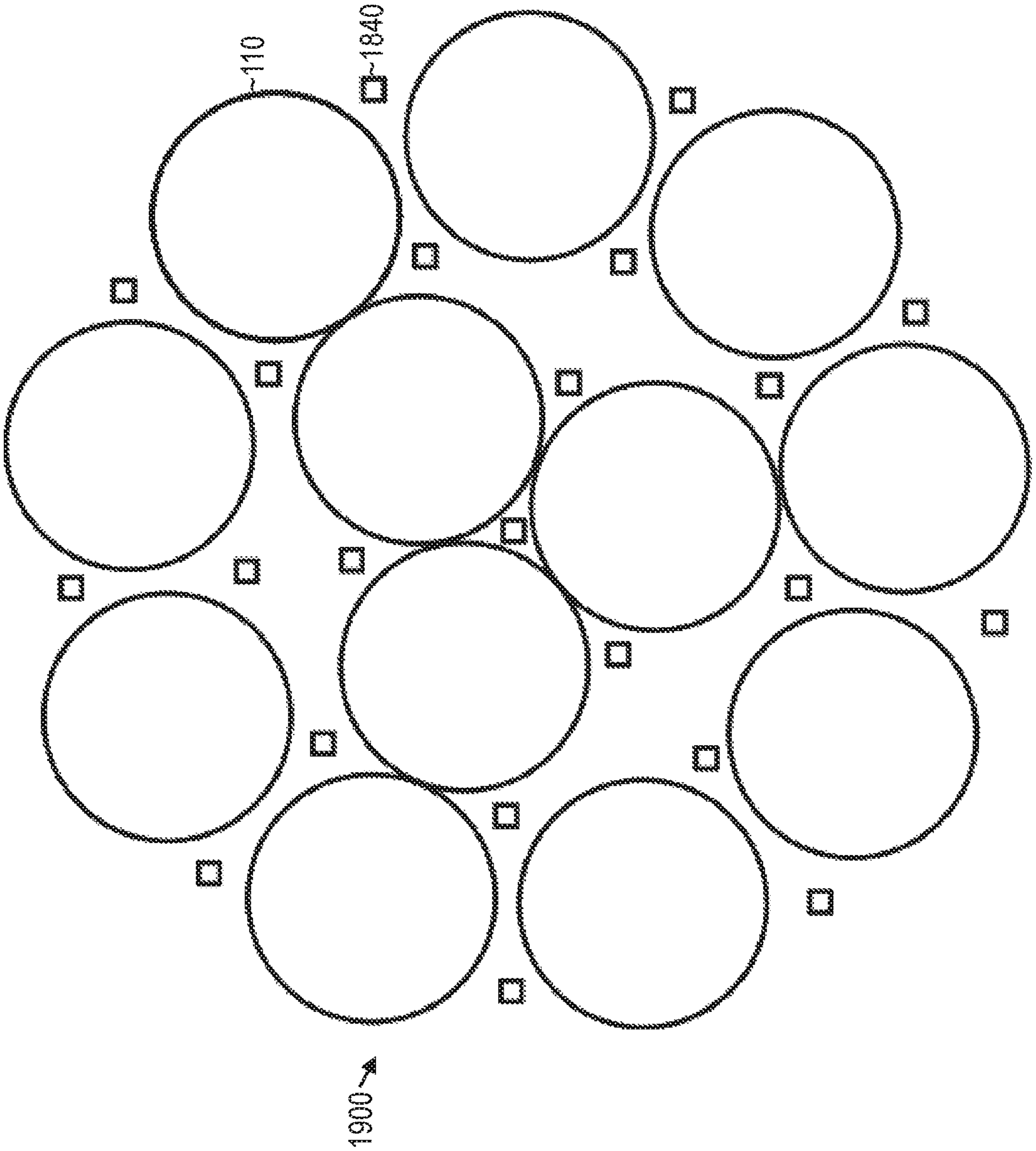
FIG. 19 is a diagram of another exemplary multi-band lens antenna.

FIGS. 18 and 19 illustrate exemplary multi-band lens antennas 1800 and 1900. As shown in FIGS. 18 and 19, the multi-band lens antennas 1800 and 1900 include circular shaped lens sets 110 and a second antenna array with lower-frequency antenna elements 1840. For example, the antenna elements 1840 may be patch antennas, dielectric resonator antennas, etc., and can generally have a square shape. One or more antenna elements 1840 can be positioned between adjacent lens sets 110, which can touch one another (FIG. 18) and/or one or more can be separated apart by a distance (FIG. 19).

The hexagonal arrays (FIG. 16) are the most dense and achieve the highest performance for the given size. However, other arrangements can yield better radiation patterns and allow operation in other applications and circumstances, such as those shown in FIGS. 17-19. Accordingly, the lens sets can have any suitable size, shape and spacing, and the antennas can be interspaced about the lens sets in any suitable manner and can have any suitable size, shape and positioning with respect to the lens sets.

This disclosure uses several geometric or relational terms, such as thin, hexagonal, hemispherical and orthogonal. In addition, the description uses several directional or positioning terms and the like, such as below. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact because of, for example, tolerances allowed in manufacturing, etc. And, other suitable geometries and relationships can be provided without departing from the spirit and scope of the invention.

As described and shown, the system and method of the present invention include operation by one or more circuits and/or processing devices, including the CPU 1202 and processors 1110, 1112. For instance, the system can include a lens set circuit and/or processing device 150 to adjust embedded radiation patterns of the lens sets, for instance including the components of 304 and associated control circuitry; and an antenna circuit and/or processing device to adjust the antenna radiation pattern, which may take the form of a beamforming circuit and/or processing device such as 306 and 308, or their digital alternatives as in 1102, 1104, 1106, 1108, 1110, and 1112, and the antenna circuitry may include additional components such as 1202, 1206, and 1208. It is noted that the processing device can be any suitable device, such as a chip, computer, server, mainframe, processor, microprocessor, PC, tablet, smartphone, or the like. The processing devices can be used in combination with other suitable components, such as a display device (monitor, LED screen, digital screen, etc.), memory or storage device, input device (touchscreen, keyboard, pointing device such as a mouse), wireless module (for RF, Bluetooth, infrared, Wi-Fi, etc.). The information may be stored on a computer hard drive, on a CD ROM disk or on any other appropriate data storage device, which can be located at or in communication with the processing device. The entire process is conducted automatically by the processing device, and without any manual interaction. Accordingly, unless indicated otherwise the process can occur substantially in real-time without any delays or manual action.

The system and method of the present invention is implemented by computer software that permits the accessing of data from an electronic information source. The software and the information in accordance with the invention may be within a single, free-standing processing device or it may be in a central processing device networked to a group of other processing devices. The information may be stored on a chip, computer hard drive, on a CD ROM disk or on any other appropriate data storage device.

Within this specification, the terms "substantially" and "relatively" mean plus or minus 20%, more preferably plus or minus 10%, even more preferably plus or minus 5%, most preferably plus or minus 2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention. Each of the exemplary embodiments described above may be realized separately or in combination with other exemplary embodiments.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A satellite communication system, comprising:

a support;

a two-dimensional first antenna array of lens sets to communicate to or from a satellite and supported by the support, each of the lens sets including a lens and one or more feed elements configured to transmit or receive electromagnetic signals that pass through the lens, wherein the lens of each of one or more of the lens sets is a non-spherical lens; and a two-dimensional second antenna array comprising antenna elements interspersed among the lens sets of the two-dimensional first antenna array, the two-dimensional second antenna array supported by the support, wherein the lens of each of the one or more of the lens sets has a phase center, and wherein the phase centers are not uniformly distributed.

2. The satellite communication system according to claim 1, wherein the lens of each of the one or more of the lens sets includes a flat surface proximate the one or more feed elements of the lens set.

3. The satellite communication system according to claim 1, wherein the phase centers are arranged in an aperiodic arrangement.

4. The satellite communication system according to claim 1, wherein the support is configured to support the one or more feed elements of at least one of the lens sets.

5. The satellite communication system according to claim 4, further comprising one or more actuators configured to move the support such that the one or more feed elements of the at least one of the lens sets are moved relative to the lens of the at least one of the lens sets.

6. The satellite communication system according to claim 5, wherein the one or more actuators are configured to move the support laterally and/or rotationally.

7. The satellite communication system according to claim 5, further comprising a housing configured to cover the support and the lens sets, wherein the one or more actuators are configured to move the support within the housing.

8. The satellite communication system according to claim 7, wherein a width of the housing is greater than a height of the housing.

9. The satellite communication system according to claim 4, wherein the support is a flat plate.

10. A satellite communication system, comprising:

a support;

a two-dimensional first antenna array of lens sets to communicate to or from a satellite and supported by the support, each of the lens sets including a lens and one or more feed elements configured to transmit or receive electromagnetic signals that pass through the lens, wherein the lens of each of one or more of the lens sets is a non-spherical lens; and a two-dimensional second antenna array comprising antenna elements interspersed among the lens sets of the two-dimensional first antenna array, the two-dimensional second antenna array supported by the support, wherein the lens sets transmit or receive electromagnetic signals in an L band and the antenna elements transmit or receive electromagnetic signals in a Ka band or a Ku band.

11. The satellite communication system according to claim 10, wherein, for at least one of the lens sets, one or more of the one or more feed elements is selectively activated to adjust a beam produced by the lens set without movement of the lens set.

12. The satellite communication system according to claim 11, wherein each of the lens sets contacts at least one adjacent one of the lens sets.

13. The satellite communication system according to claim 10, wherein the two-dimensional second antenna array lacks lenses.

14. An antenna system, comprising:

a two-dimensional first antenna array of lens sets configured to communicate with a satellite, each of the lens sets including a lens and one or more feed elements configured to transmit or receive electromagnetic signals through the lens, wherein the lens of each of one or more of the lens sets is a non-spherical lens; and a two-dimensional second antenna array of antenna elements interspersed with the lens sets of the two-dimensional first antenna array, wherein the lens sets are configured to transmit or receive electromagnetic signals in a first frequency band, and the antenna elements are configured to transmit or receive electromagnetic signals in a second frequency band, different than the first frequency band.

15. The antenna system according to claim 14, wherein the first frequency band is an L band and the second frequency band is a Ka band or a Ku band.

16. The antenna system according to claim 14, wherein each of the lens sets contacts at least one adjacent one of the lens sets, and each of the antenna elements contacts at least one of the lens sets.

17. An antenna system, comprising:

a two-dimensional first antenna array of lens sets configured to communicate with a satellite, each of the lens sets including a lens and one or more feed elements configured to transmit or receive electromagnetic signals through the lens, wherein the lens of each of one or more of the lens sets is a non-spherical lens; and a two-dimensional second antenna array of antenna elements interspersed with the lens sets of the two-dimensional first antenna array, wherein the lens of each of one or more of the lens sets has a phase center, and wherein the phase centers are arranged in a non-uniform arrangement.

18. The antenna system according to claim 17, wherein the two-dimensional second antenna array lacks lenses.

19. The antenna system according to claim 17, wherein the one or more feed elements of at least one of the lens sets is arranged on a feed support and the one or more feed elements of the at least one of the lens sets are configured to move laterally or rotatably relative to a respective lens via movement of the feed support.

20. The antenna system according to claim 19, further comprising a cover covering the two dimensional first antenna array and the two dimensional second antenna array, and wherein the cover is sized such that movement of the one or more feed elements is inside the cover.

* * * * *